(12) United States Patent
Hennon

(10) Patent No.: US 9,038,968 B2
(45) Date of Patent: May 26, 2015

(54) ATTACHABLE GROMMETS FOR HANGING PIPES

(76) Inventor: John Hennon, Wall Township, NJ (US)

( * ) Notice: Subject to any disclaimer, the term of this patent is extended or adjusted under 35 U.S.C. 154(b) by 121 days.

(21) Appl. No.: 13/460,343

(22) Filed: Apr. 30, 2012

(65) Prior Publication Data

US 2012/0217353 A1  Aug. 30, 2012

Related U.S. Application Data

(63) Continuation-in-part of application No. 12/815,738, filed on Jun. 15, 2010, which is a continuation-in-part of application No. 12/481,016, filed on Jun. 9, 2009, now Pat. No. 8,596,589.

(51) Int. Cl.
*F16L 3/00* (2006.01)
*F16L 3/10* (2006.01)
*F16L 3/22* (2006.01)
*F16L 55/035* (2006.01)

(52) U.S. Cl.
CPC .............. *F16L 3/1016* (2013.01); *F16L 3/1091* (2013.01); *F16L 3/222* (2013.01); *F16L 3/1075* (2013.01); *F16L 55/035* (2013.01)

(58) Field of Classification Search
CPC .......... F16L 3/1091; F16L 3/1016; F16L 3/00; F16L 3/10; F16L 3/222; F16L 3/12; F16L 3/1226
USPC .............. 248/65, 49, 67, 68.1, 73, 74.1, 74.3, 248/74.2; 138/106; 285/365
See application file for complete search history.

(56) References Cited

U.S. PATENT DOCUMENTS

| | | | | |
|---|---|---|---|---|
| 1,710,060 | A | * | 4/1929 | Metcalf, Jr. ................ 285/149.1 |
| 4,270,250 | A | * | 6/1981 | Schon ........................... 24/114.5 |
| 5,996,945 | A | * | 12/1999 | Coles et al. .................. 248/68.1 |
| 8,313,065 | B2 | * | 11/2012 | Birch ............................ 248/74.4 |
| 8,596,589 | B2 | * | 12/2013 | Hennon ........................ 248/67.5 |
| 2012/0256416 | A1 | * | 10/2012 | Ikeda et al. .................... 285/365 |

* cited by examiner

*Primary Examiner* — Todd M Epps
(74) *Attorney, Agent, or Firm* — Michael P. Kochka, Esq.

(57) ABSTRACT

A plastic, polymeric or silicone grommet used as a dampener or insulator for round and/or hex style tube, pipe and conduit hangers, and particularly to a grommet having a channel portion and a rounded edge portion which directly surrounds the edges of hanger brackets used as pipe supports. Each flat surface of the grommet is substantially rounded to prevent the collection of liquids, dirt or debris.

13 Claims, 20 Drawing Sheets

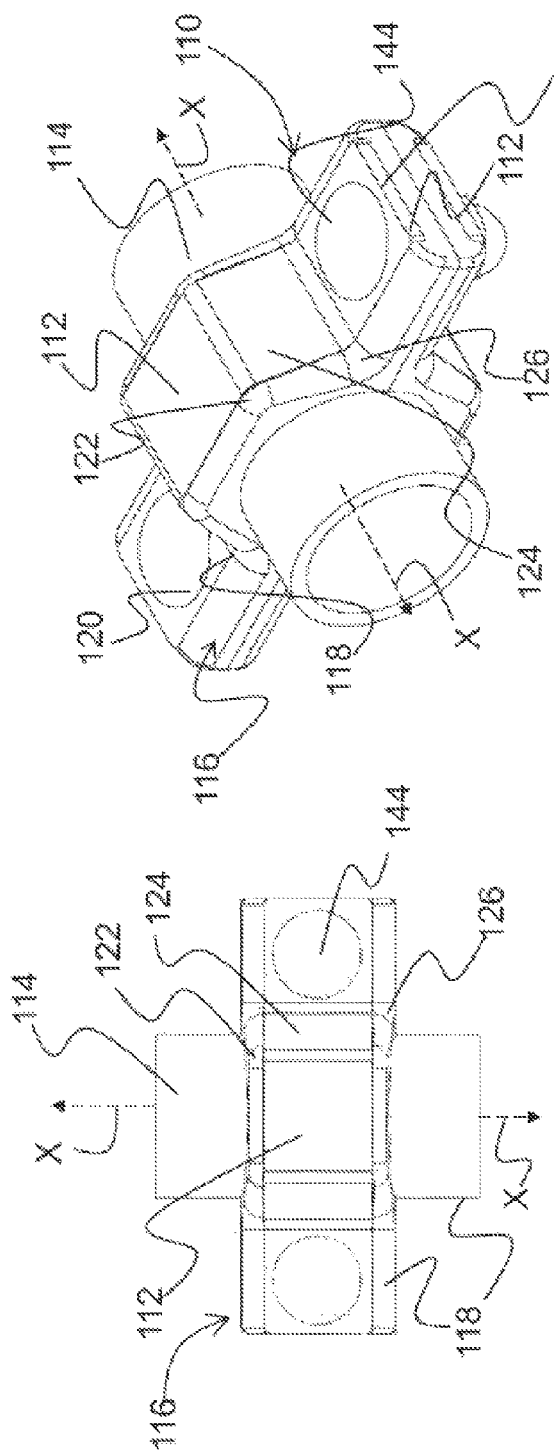

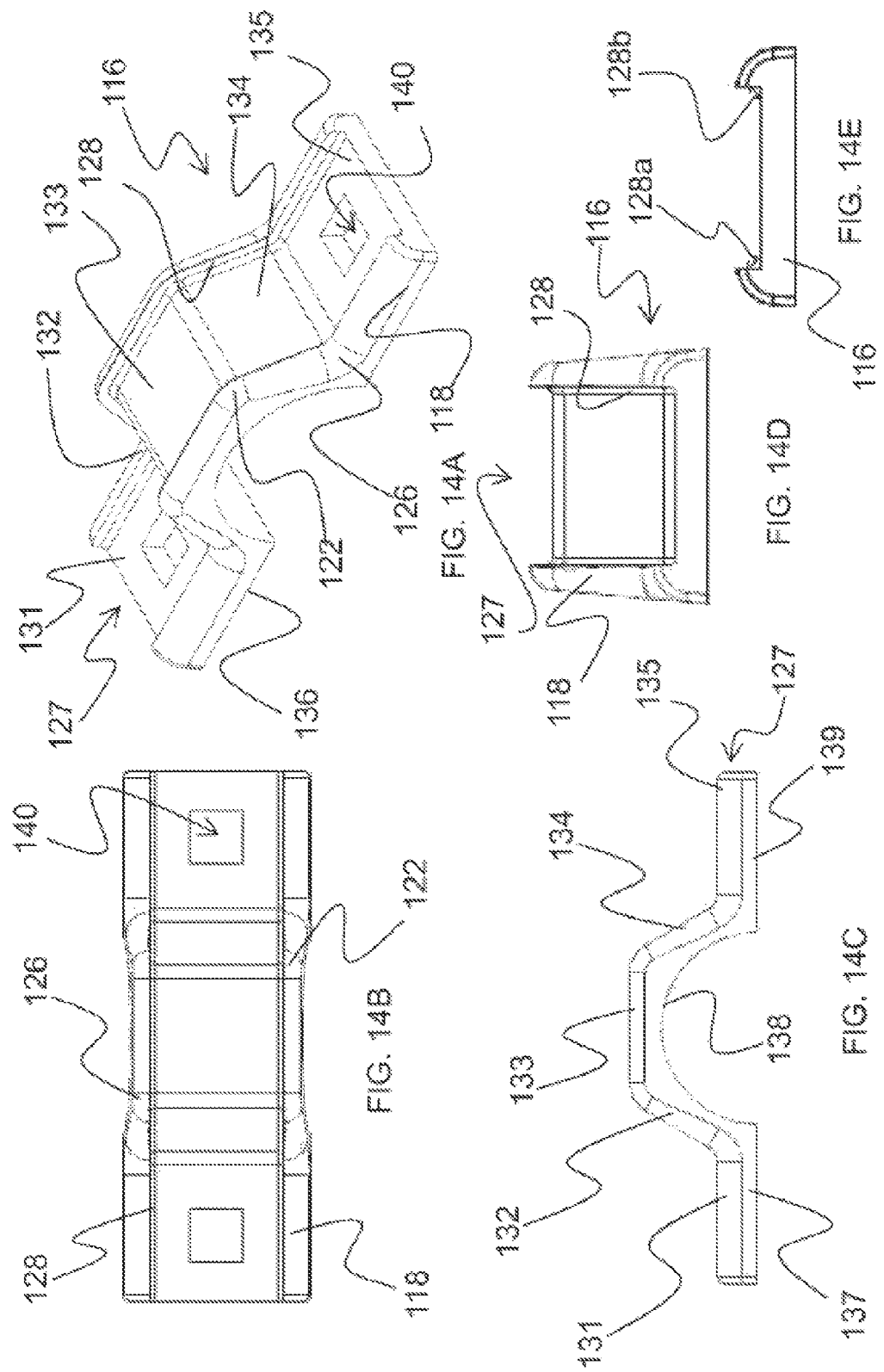

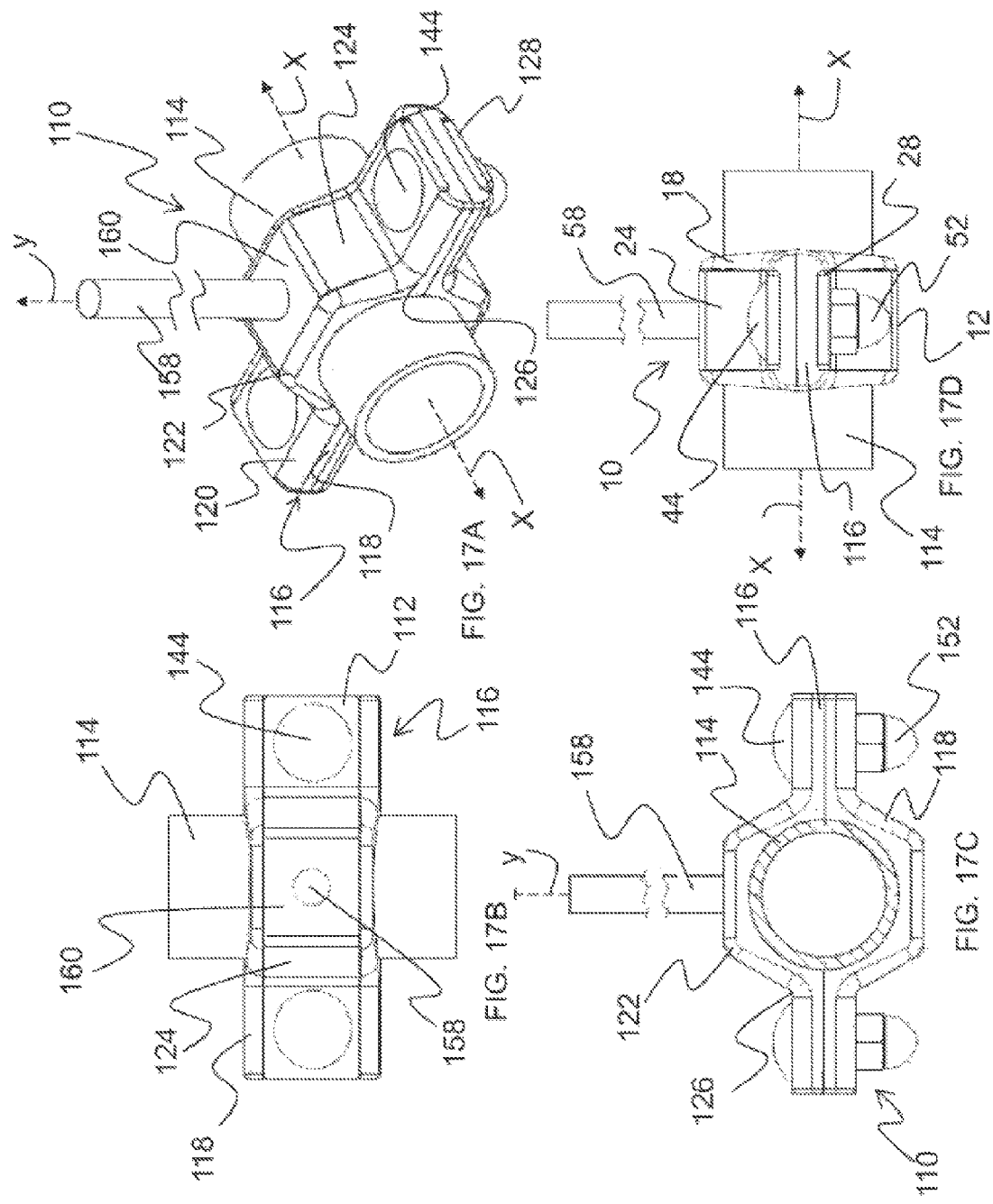

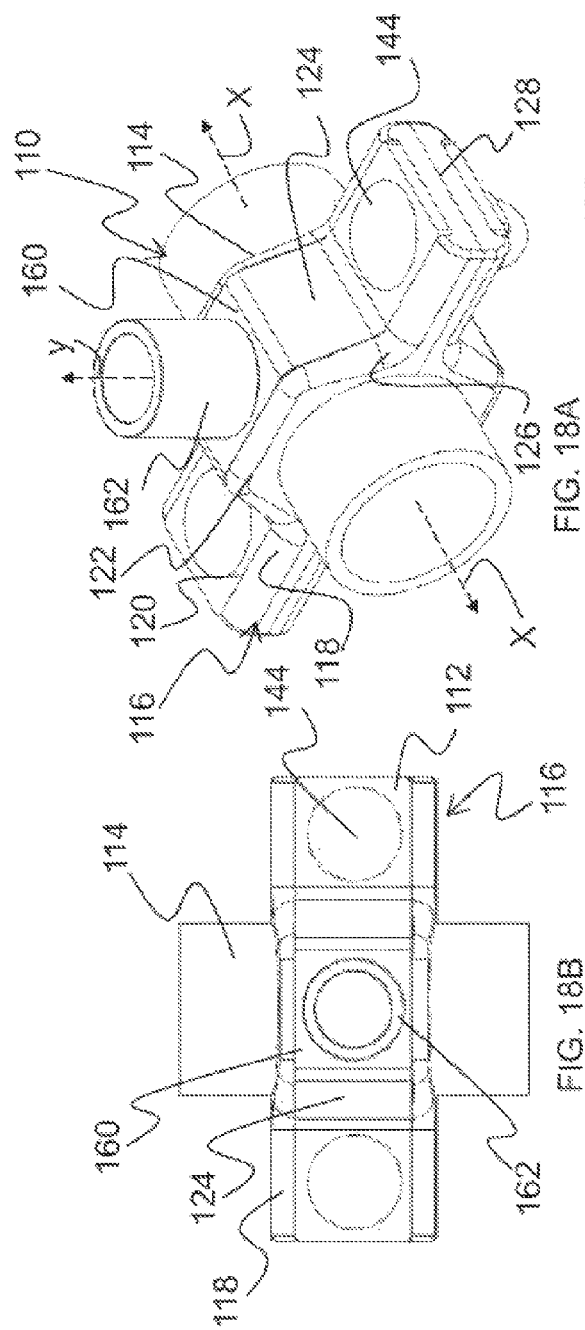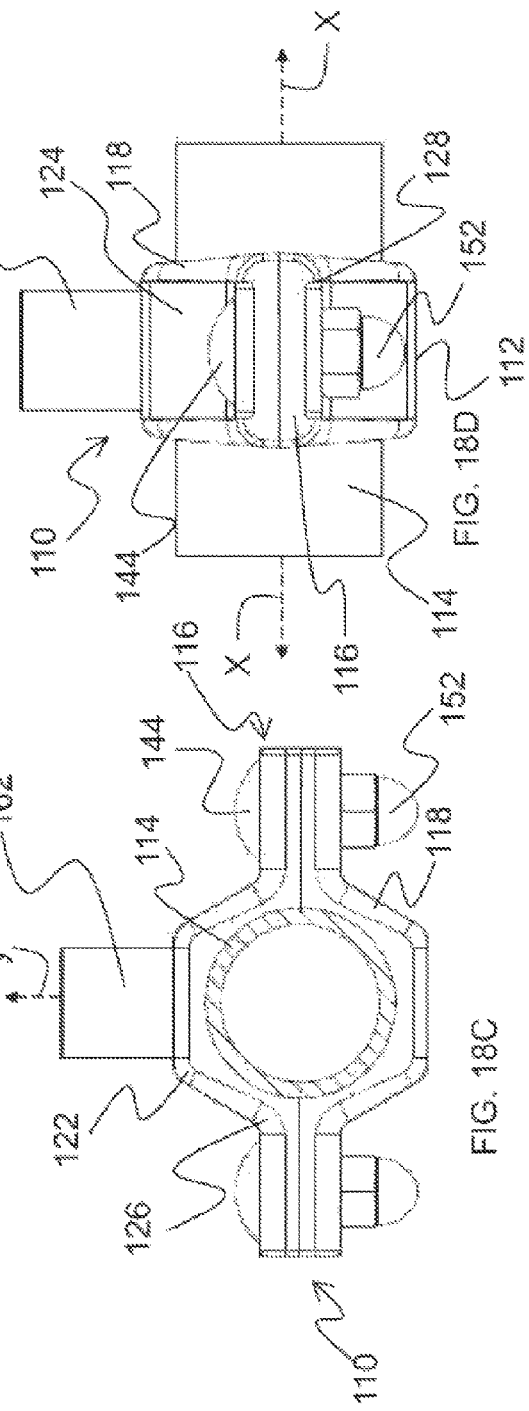

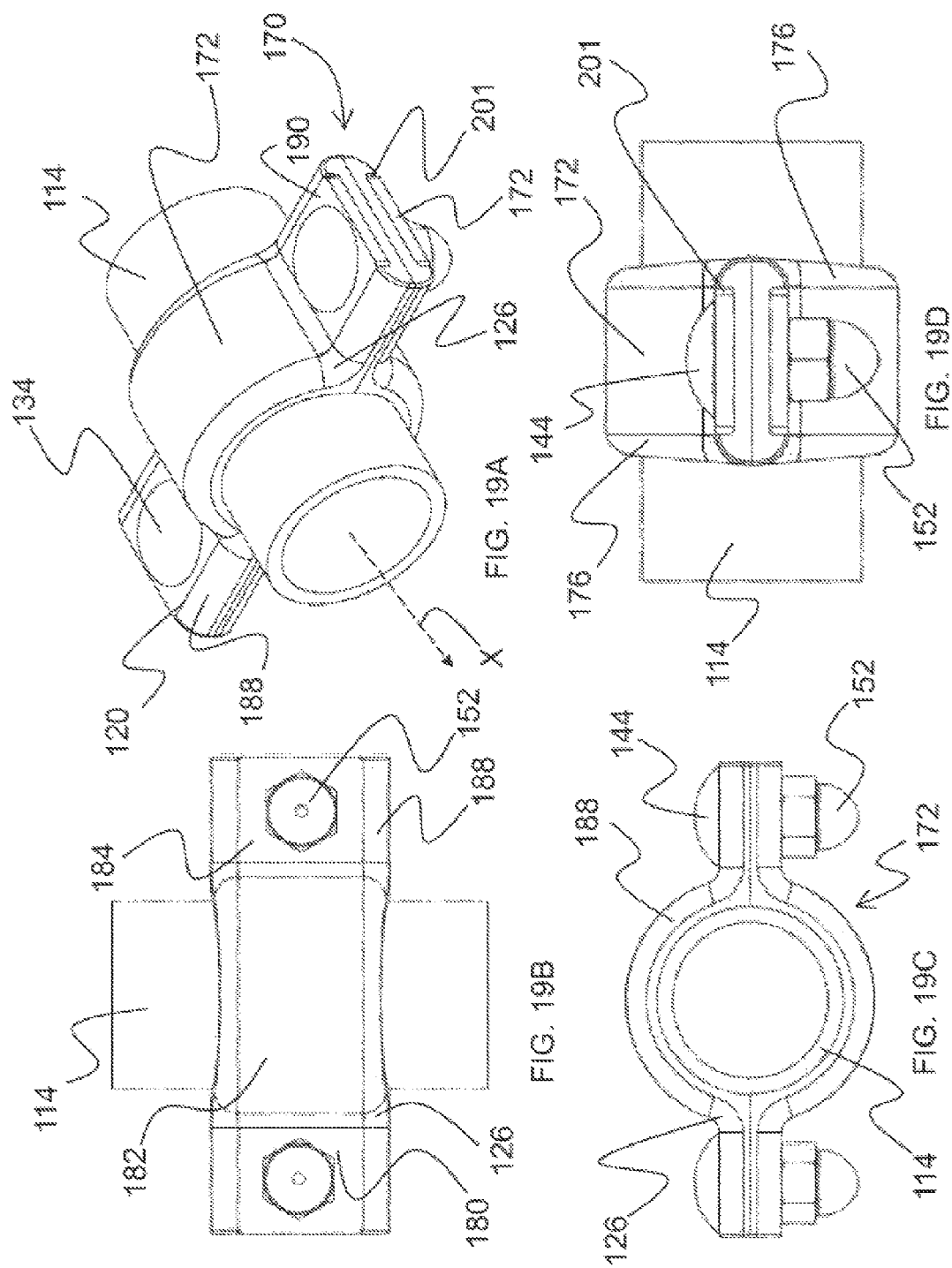

ATTACHABLE GROMMETS FOR HANGING PIPES

This application is a Continuation-In-Part Application and claims the benefit of prior U.S. patent application Ser. No. 12/481,016 filed Jun. 9, 2009 and entitled Attachable Grommets for Hanging Pipes, which is now U.S. Publication No. US-2010-0308183 published Dec. 9, 2010 and U.S. patent application Ser. No. 12/815,738 filed Jun. 15, 2010 and entitled Attachable Grommets for Hanging Pipes, which is now U.S. Publication No. US-2010-0308184 published Dec. 9, 2010 all of which are hereby incorporated by reference in their entirety.

FIELD OF THE INVENTION

The present invention relates to block, round, or hex style tube and pipe hangers which include plastic or silicone grommets that are used as a dampener or insulator for hanging tubes and pipes and particularly to a post and port arrangement for securing and aligning the polymeric grommets during initial mounting and placement. The grommets are typically two opposing symmetrical parts that together define a passage having an inner diameter which directly surrounds and supports the pipe or tube, the post and port arrangement provides a structure and method for connecting the polymeric grommet parts and supporting the grommets on the pipe or tube during installation of the frame and support structure. Each flat surface of the grommets is substantially sloped to prevent the collection of liquids, dirt or debris.

BACKGROUND OF THE INVENTION

Pipe and tube supports are known for their use in supporting piping systems in residential and commercial buildings as well as throughout numerous industrial manufacturing facilities, for example, food, dairy, beverage, chemical, personal care, bioprocessing, and pharmaceutical manufacturing industries. Many pipe hanging configurations have either an inner layer or an inner block made from some elastomeric material to provide some combination of dampening, shock absorption, and insulation. With respect to industrial facilities, especially those in which clean rooms, sanitary and sterile environments are critical to the manufacturing process, the known pipe supports are configured to have a smooth contact surface on the insert to prevent bacterial build up and other contaminants from collecting. Any flat surface on the pipe and tube support increases the potential for dust, debris, bacteria or cleaning solution to collect or puddle. It is for this purpose that hygienic/sanitary system designs call for limiting flat surfaces. Existing square or block style supports/hangers have opposing flat faces generally defined by the opposing front and back faces of inserts which directly support the pipe or tube. The two flat faces being the front and back substantially planar surfaces through which the line, i.e. piping or tubing, extends perpendicularly. When such square or block design supports are used to support horizontally run lines, the flat faces are generally vertically aligned with respect to the horizontal and thus liquids and debris and anything else is motivated downwards off the planar front and back faces by gravity. On the other hand, if the square or block design is supporting a vertically run line the flat faces are now substantially horizontal to a ground surface and at least the top, upwardly exposed face of the support/hanger creates an area where dust, debris and liquids can collect.

Block style hangers may use plastic or silicone grommets which define an inner diameter (I.D.) to directly support and encompass the outer diameter (O.D.) of a pipe or tube. The silicone or plastic grommets are themselves supported by a metal frame which is often welded to supporting structural steel or secured by threaded connections to a hanger. These block style hangers may be used individually or due to their substantially square or rectangular shape may alternatively be easily and efficiently stacked in a vertical relationship to provide an offset between multiple pipes arranged and mounted in parallel.

The grommets act as a dampening cushion or insulator to reduce vibration between the hardware and the supported utility. The pipes or conduits may also face thermal expansion and contraction as heated liquid or steam is forced through the conduit for steam cleaning and sanitization of the conduit or of a work area. The grommet forms a guide around the supported utility line permitting movement in a predetermined linear direction while restraining movement in other directions. The grommet parts define the molded I.D. which fits around the O.D. of the pipe, tube or conduit. The size of the I.D. in the grommet controls the amount of force required to allow the tube, pipe or conduit to slide through the grommets. A smaller I.D. creates a tight fit or an anchor and a larger I.D. creates a loose fit or a guide which allows the tube, pipe or conduit to slide along an axis. To restrict vibration of the pipe the grommet must be fit snugly around the pipe. In a square or block design, the grommet is often made of two pieces of symmetrical rigid plastic material and an inner diameter may be enlarged to snugly fit around the pipe. Wedges may then be inserted to loosen the fit of the insert around the conduit allowing for thermal expansion of the pipe. The insertion of wedges leaves spaces that may act as collectors for dust and debris. A loose fit from incorrectly sized or installed wedges may also result in vibration of the pipe or conduit which may cause a rupture of a pipe connecting flange or ferrule connecting two pipes which may allow hot steam of liquid to spew from the pipe causing a safety hazard.

The known grommets and inserts for such hangers are held together and in place around the pipe or conduit solely by the use of mounting hardware and framework or brackets that attach the grommets to one another around the pipe or conduit. This creates a problem for the installer since the grommets must be both held in position by the installer, usually by hand, relative to the pipe or tube, and also in respect to one another while the hardware and framework are installed. Also, because the grommets are not secured together, the sliding of the pipe or tube can cause shifting of the grommet parts relative to one another and with respect to the mounting hardware and framework.

U.S. Pat. No. 4,270,250 to Schon discloses an improved clamp for tubular members that use interchangeable elastomeric or polymeric inserts. Schon '250 provides a way for the inserts to attach to a clamping block, but does not provide a way for the inserts to attach to the tube. Furthermore, the clamping block can only be attached by using external fastening devices.

U.S. Patent Application No. 2005/0205722 A1 to Krueger discloses a pipe and tube support that claims a swivel style mounting point along a vertical axis with an opening having a single bolt capture and opposing hinge placed at a 90° angle off of the vertical axis. The Krueger '722 support also has upper and lower dome-shaped housing sections with internal liners for holding the pipe. The internal liners are attached to the hardware used for hanging the pipe and do not provide an efficient way to secure the liners together and to attach the liners to the pipe.

OBJECTS AND SUMMARY OF THE INVENTION

The present invention relates to block, round and hex style pipe, tube and conduit supports that provide a way to attach around a pipe, tube, or conduit. The invention has opposing grommets of a polymeric material, such as plastic, silicone, or PVC, that attach to each other around a pipe. A further embodiment has a single grommet of an elastomeric material, such as silicone, rubber, or some type of thermoplastic, that can be twisted and then slipped or placed around a pipe. The grommets are used to dampen and insulate the supported conduit in the hanger or support. The soft elastomeric material of the grommet restricts vibration while allowing for thermal expansion and contraction. The grommet material also grips completely around the pipe or conduit, removing gaps and a requirement to use wedges to tighten the fit or to resize the inner diameter of the grommet. The removal of gaps and wedges removes collection surfaces that could accumulate dust or debris.

The grommet inserts also function as a guide allowing for line expansion and contraction while producing a snug fit that greatly reduces vibration of the conduit. The present invention also uses a small elastomeric, polymeric, foam, rubber or even a metal or steel receiver disc formed to fit within a threaded receiver of a nut. The disk material is selected to match the supports/hangers applications environment. The receiver disc is forced to the bottom of the receiver by the insertion of the bolt and provides essentially a spring bias to the bolt which allows the bolt inserted into the receiver to bottom out against the disc surface and compress the disc against the bottom of the receiver. The disc provides axial spring bias between the bolt and the receiver for controlling axial expansion and contraction which can affect the threaded radial and axial relationship of the bolt and receiver. The elastomeric disc helps prevent loosening, or backing out, of the bolt while ensuring that the bolt is stopped and not over-tightened so that the grommet does not squeeze the pipe or tube too tightly while allowing the expansion or contraction of the supported utility line. The elastomeric disc allows the bolt to seal against the disc and compress the disc in the receiver and create an internal biasing effect like that of a common external lock-washer which ensures that a continual snug fit of the grommet insert around the pipe or conduit is maintained, while ensuring there is sufficient room for the pipe, tube or supported line to expand and contract while also greatly limiting pipe vibration and reducing the safety hazard of separation of a pipe support.

During installation, once the grommets are either attached to each other or twisted and placed around the tube, pipe or conduit, the accompanying hardware can be installed more efficiently because the installer does not need to manually hold the grommet parts together and in place while the mounting framework is installed. With the grommets or singular grommet block self-supporting itself on the pipe, and with the bolt holes through the grommets aligned, the installer can use both hands to install hardware, framework and supporting brackets for the grommets and pipe supports. The block shape of the invention allows the grommets to be stacked on top of each other, allowing the invention to be used for hanging multiple pipes. This invention works with pipes, tubes, and conduits of all different standards, such as ASME, ANSI, ASTM, and others In a further embodiment of the grommet to reduce or completely eliminate any flat or horizontal surfaces that may collect debris, the top plate and the planar face surfaces of the grommet insert may be formed with a raised geometry such as in a cone or pyramid shape. The raised geometry will facilitate the drainage of dirt, debris or liquids. The raised surface portions of the face may gradually slope from a highest point downwards towards the outer sections of the top of the hanger/support, for example, the planar surfaces defining each face of the grommet insert may slope down and outwardly from the generally circular edge defining the opening for the conduit or line, to the outer edges of the grommet thereby eliminating horizontal surfaces when the grommet is mounted in a horizontal configuration for a vertical line, pipe or conduit.

In a still further embodiment of the present invention the grommet is formed with a channel to mate and hold the grommet to round and/or hex style pipe, tube and conduit supports. In this embodiment, a round or hex style bracket may be frictionally secured within the grommet channel to assist in the installation of the conduit support around a pipe, tube, or conduit. A single rounded bracket and grommet may be mated and secured, and then separated to open and place the bracket and grommet around a pipe. The bracket support with grommet does not require holding the separate bracket and grommet pieces together but simply rests on the pipe and provides for an installer to use both hands to secure the support to the pipe. The securing of the bracket and grommet together further provides for a first and second bracket and grommet pair to be mated and secured around a pipe with an installer needing only to hold the two pairs as single pieces and then secure the pairs to the pipe using attachment hardware.

In this present embodiment, the formation of the grommet channel extends rounded surfaces out and around the round and/or hex style bracket thereby eliminating flat surfaces that are areas of debris collection. These rounded surfaces also provide for run off when hosing or spray cleaning a food, chemical, pharmaceutical or other sanitary manufacturing facility. The extension of the surfaces of the grommet around the bracket support also dampens and insulates the supported conduit in the hanger or support. As described above, the soft elastomeric material of the grommet restricts vibration while allowing for thermal expansion and contraction. The grommet material also grips completely around the pipe or conduit, removing gaps and a requirement to use wedges to tighten the fit or to resize the inner diameter of the grommet. The removal of gaps and wedges eliminates collection surfaces that could accumulate dust or debris.

An object of the present invention is to simplify the total installation of a pipe hanger by allowing the grommets themselves to attach to each other or twist around a pipe, without having to rely on external mounting hardware or brackets to maintain the connection of the grommet(s) to the pipe during installation.

Another object of the invention is to provide a means of attaching two pipe hanger grommets to each other and around a pipe by utilizing a post and port system that creates a compression fit due to the relative sizes of the post and port. The post and port shapes can be smooth, ribbed, barbed, etc. such that the fit inside of the port is secure and keeps the grommets attached to each other without assistance.

A further object of the present invention is to provide a means of attaching a grommet around a pipe by utilizing a grommet block made from a flexible material that has a split in one side to allow the block to be twisted and slipped or placed around a pipe.

A still further object of the invention is to properly align the grommet bolt holes when connected to allow the metal hardware to attach properly and easily each time the present invention is used.

A yet still further object of the invention is to provide a more efficient and safer method for installing pipe hangers since the present invention frees up a hand that would otherwise be used to hold the grommet block. Having the grommet block already on the conduit without the requirement to hold it in place while installing the metal hardware saves time and helps prevent the hardware from falling while it is being installed.

Another object of the invention is to act as either an anchor or a guide for supported pipes. In an application of this invention as an anchor, the installation of the invention will provide a snug fit around the supported conduit. An anchor or snug fit will prevent essentially all pipe rotation or displacement at the point of application. When this invention acts as a guide, the installation of the invention will provide a loose fit around the supported conduit. A guide or loose fit will permit pipe movement in a predetermined linear direction while the post and port structure ensures that pipe movement does not alter the grommet alignment or support in the framework or bracket. The material chosen for the grommet can help provide the desired properties to facilitate either the anchor or guide configuration.

A still further object of the present invention is the purpose of acting as a dampening cushion between the suspension assembly (consisting of an attachment to a ceiling, wall or other support and a rod or extension that attaches to the grommet block hardware) and the supported pipe, tube, or conduit. The invention is of a plastic or silicone material that supports the conduit inside. Further, the invention also acts as an insulator between the hardware and the supported pipe, tube, or conduit since the grommets are made from a nonconductive material.

A still further object of the present invention is a pipe supporting apparatus having a grommet block having an upper grommet and a lower grommet that defines a pipe passage therebetween and at least one post provided on one of the upper and lower grommets, at least one receiving port provided on the opposing corresponding one of the upper and lower grommets for receiving the at least one post, at least one bolt hole extending through the upper and lower grommets; and wherein the post and port are provided with a mating friction fit so that the upper and lower grommet blocks can be removably secured to one another without any corresponding hardware or support.

A still further object of the present invention is a pipe supporting apparatus having an elastomeric or polymeric grommet block having a pipe passage formed therein, the grommet block having a first flange and a second flange flexible about a torsional axis to provide separation between a matingly engageable surface of the first and second flange; at least one bolt hole extending through the grommet block; and wherein the separation of the first and second flange allows the elastomeric or polymeric grommet and the pipe passage to be positioned about and encompass a conduit.

Another object of the invention is the restriction of vibration by using an, elastomeric, disc or similar springably biased disc between the bolt and receiver that allows expansion and contraction of the pipe conduit without compromising the secure threaded fit between the bolt and receiver nut.

Another object of the present invention is a snug yet yielding fit and seal of the grommet around the conduit removing the requirement of wedges or inserts to tighten the fit.

Another object of the present invention is to control the amount of compression of the elastomeric grommet around the pipe or conduit by using elastomer or metal inserts to bottom out the connecting bolts.

Another object of the present invention is the elimination or reduction of all flat or horizontal sections of the grommet and support hardware to facilitate drainage of dirt, debris or liquids.

A further object of the present invention is a gradual slope, cone, pyramid or rounded shape on the top section of the grommet and hardware support permitting drainage of dirt, debris or liquids.

A further object of the present invention is a gradual slope, cone, pyramid or rounded shape on each of the planar face sections of the grommet insert permitting drainage of dirt, debris or liquids.

A still further object of the present invention is a pipe supporting apparatus comprising a grommet block having an upper portion and a lower portion that define a pipe passage extending from a front face of the grommet block to a back face of the grommet block and wherein each of the front and back face of the grommet block being defined by a sloped surface extending radially outwardly from an inner edge of the grommet block towards an outer edge of the grommet block.

Another object of the invention is the restriction of vibration by using a grommet between a first and second bracket that allows expansion and contraction of the pipe conduit without compromising the secure threaded fit between the bolt and receiver cap nut.

A still further object of the invention is to properly align the grommet bolt holes when connected to allow the metal hardware to attach properly and easily using only one wrench or other tool each time the present invention is used.

A still further object of the present invention is a pipe supporting apparatus comprising at least one hardware bracket having an edged surface; at least one grommet mating to the at least one hardware bracket and defining a pipe passage and wherein the at least one grommet extends out and around the edged surface of the hardware bracket providing rounded surfaces for run off and to deter the collection of debris.

A still further object of the present invention is a pipe supporting apparatus comprising a first hardware bracket having an edged surface; a first grommet having rounded edges extending out and around the edged surface of the first hardware bracket; a second hardware bracket having an edged surface; a second grommet having rounded edges extending out and around the edged surface of the second hardware bracket and wherein the first bracket and first grommet and second bracket and second grommet are secured together defining a pipe passage to be positioned about and encompass a conduit.

The present invention is directed to a pipe supporting apparatus comprising a grommet having an upper portion and a lower portion that define a pipe passage extending through the grommet, an upper bracket and a lower bracket for supporting the grommet including an attachment or securing mechanism for securing the upper and lower brackets with the grommet, and wherein the grommet is provided on an outer surface with a channel for receiving a mating portion of at least one of the upper and lower brackets to maintain the relative alignment and securing of the grommet and at least one of the upper and lower brackets even where the pipe passage in the grommet is subjected to axial forces from a supported pipe.

The present invention is further directed to a pipe supporting apparatus comprising a bracket having an upper surface, a lower surface and surrounding side edges, a grommet having an upper surface and a lower surface and surrounding side edges, the grommet defining a channel in the upper surface for receiving the bracket and wherein the channel is defined along a length of the grommet by the side edges of the grommet having an outer surface which is sloped from an upper edge to a lower edge intersecting with one of a front and back faces of the grommet.

The present invention is further directed to a method of connecting a pipe supporting apparatus to a conduit comprising the steps of providing a bracket having an upper surface, a lower surface and surrounding side edges, forming a grommet having an upper surface and a lower surface and surrounding side edges, the grommet defining a channel in the upper surface for receiving the bracket; and defining the channel along a length of the grommet by forming the side edges of the grommet having an outer surface which is sloped from an upper edge to a lower edge intersecting with one of a front and back faces of the grommet.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which:

FIG. 2a shows an inset of the planar end surface and connection points of the grommet of the present invention;

FIG. 4a shows an inset of the intermediate receiving bolt for connecting the stacked grommet blocks of the present invention.

FIG. 12A is a perspective view of a first embodiment of a hex type hanger support apparatus of the present invention;

FIG. 12B is a top view of the first embodiment of a hex type hanger support apparatus of the present invention;

FIG. 12C is a planar view of the first embodiment of a hex type hanger support apparatus of the present invention;

FIG. 12D is a side view of the first embodiment of a hex type hanger support apparatus of the present invention;

FIG. 14A is a perspective view of a grommet used with the first embodiment of a hex type hanger support apparatus of the present invention;

FIG. 14B is a top view of a grommet used with the first embodiment of a hex type hanger support apparatus of the present invention;

FIG. 14C is a planar view of a grommet used with the first embodiment of a hex type hanger support apparatus of the present invention;

FIGS. 14D and 14E are side views of a grommet used with the first embodiment of a hex type hanger support apparatus of the present invention;

FIG. 17A is a perspective view of a further embodiment of a hex type hanger support apparatus with an extension rod of the present invention;

FIG. 17B is a top view of the further embodiment of a hex type hanger support apparatus of the present invention;

FIG. 17C is a planar view of the further embodiment of a hex type hanger support apparatus of the present invention;

FIG. 17D is a side view of the further embodiment of a hex type hanger support apparatus;

FIG. 18A is a perspective view of a still further embodiment of a hex type hanger support apparatus of the present invention;

FIG. 18B is a top view of the still further embodiment of a hex type hanger support apparatus of the present invention;

FIG. 18C is a planar view of the still further embodiment of a hex type hanger support apparatus of the present invention;

FIG. 18D is a side view of the still further embodiment of a hex type hanger support apparatus of the present invention;

FIG. 19A is a perspective view of a first embodiment of a round type hanger support apparatus of the present invention;

FIG. 19B is a bottom view of the first embodiment of a round type hanger support apparatus of the present invention;

FIG. 19C is a planar view of the first embodiment of a round type hanger support apparatus of the present invention;

FIG. 19D is a side view of the first embodiment of a round type hanger support apparatus of the present invention;

DETAILED DESCRIPTION OF THE INVENTION

Figure 1:
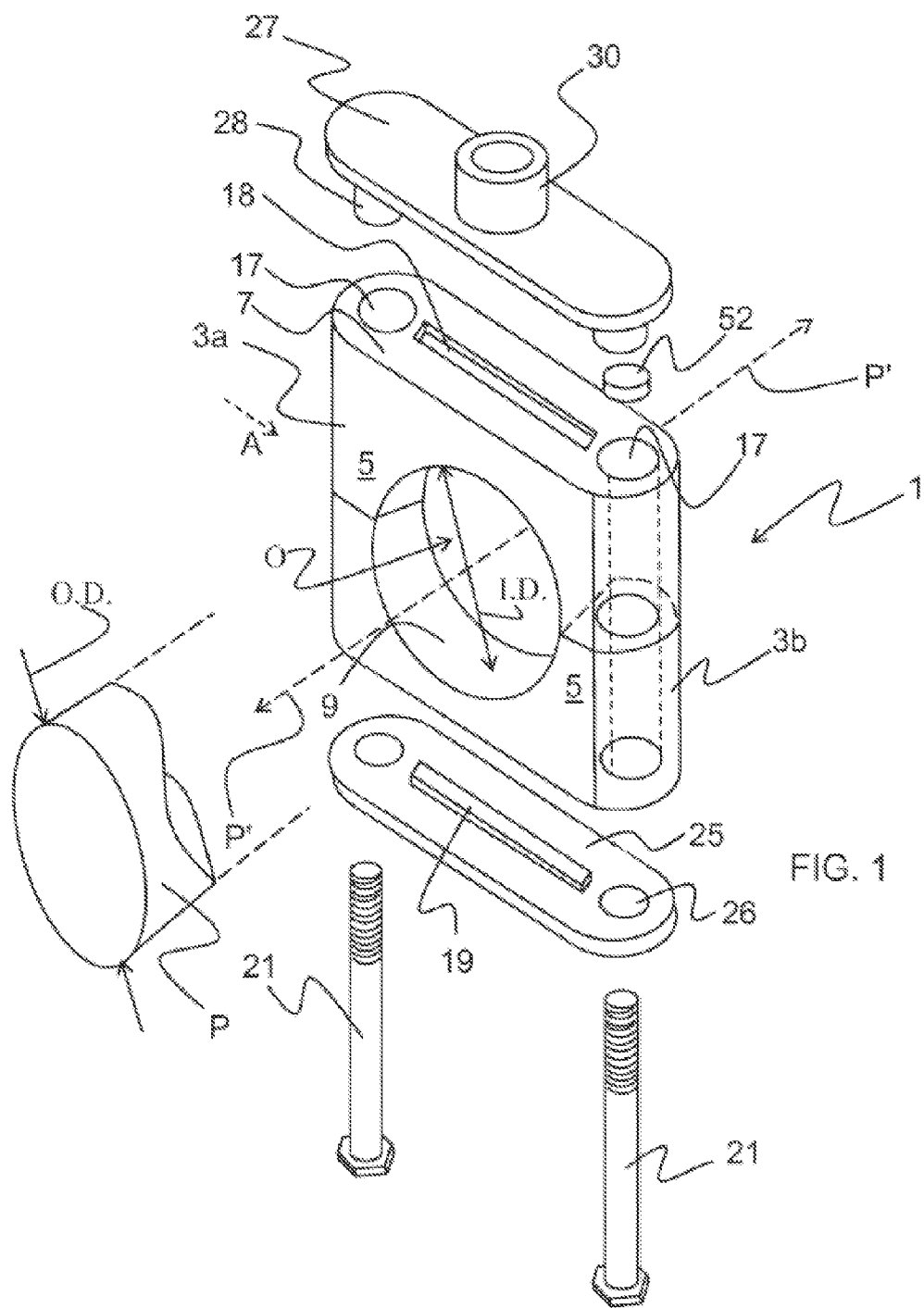
FIG. 1 shows an exploded isometric assembly view of the grommet block and framework.

In general, the present invention relates to a block style pipe and tube support including a grommet block 1 as shown in FIG. 1. The block 1 consists of two attached and substantially identical upper and lower grommets 3 defining a pipe passage O having an inner diameter (I.D.) through which a pipe, tube or conduit P having an outer diameter (O.D.) can pass. The two grommets 3 are attachable, and also separable, along a grommet separation plane A. The O.D. of the pipe can be accommodated by a range of I.D.'s of the grommet block depending on how secure the pipe is to be supported and held by the support. The tighter the tolerance of the pipe O.D. and the grommet block I.D. the more securely the pipe is held and the greater reduction in vibration of the pipe. It is to be appreciated that with a larger tolerance the pipe is more inclined, or permitted, to move or slide axially generally along a pipe axis P' in the pipe passage O. The grommets 3a, 3b can be modified to allow for different pipe sizes, tolerances etc., so that the pipe, tube, or conduit P is either securely held in the pipe passage area O or in the case of a loose fit, the conduit is guided essentially linearly along the pipe axis P' through the pipe passage O.

The grommets 3 have bolt holes or channels 17 that extend through the grommets 3a, 3b in a substantially perpendicular alignment to the pipe axis P' extending through the passage O. To this end, each grommet 3 is comprised of a pair of oppositely disposed legs 5 through which a bolt hole 17 is formed, a substantially flat top surface 7 against which a portion of the framework is generally secured, a curved inner surface 9 defining the I.D. of the passage O and each leg 5 has a substantially planar end surface 11 best shown in FIG. 2 for matingly engaging with a corresponding planar end surface of another grommet. The top surface 7 of each grommet 3 may be provided with a detent or slot 18 for receiving a corresponding protrusion or key 19 formed in an attachment plate 25, 27, or even another grommet. Such a detent or slot 18 and protrusion or key 19 would facilitate maintaining alignment of the bolt holes 17 of grommet 3 with holes 26 in the attachment plate 25 as set forth in further detail below. The union of detent 18 and the protrusion 19 could also form a compression fit or some other means of attachment to enable connecting of the attachment plates 25, 27 to the grommets 3 until a bolt 21 can be inserted through the attachment plate hole 26 and the bolt hole 17 of the grommet and be secured to a threaded receiver 28 of the corresponding attachment plate. It is also important aspect of the present invention that the receiver 28 has an O.D. that is sized to be manually press fit, or friction fit inside the bolt hole 17 of the grommet so that the grommet can hang, i.e. be attached without manual or tool assistance, to the upper attachment plate 27 as shown in FIG. 1. This allows a person assembling the hanger to push the grommet into frictionally engaged attachment with the upper attachment plate 27 and not have to use their hands to maintain the grommet attached thereto while other parts of the hanger are assembled, such as the bottom attachment plate 25.

The attachment plates 25, 27 form a framework that consists of a pair of the bolts 21 which extend through the attachment plate holes 26 and bolt holes 17 of the grommets 3 and connect and secure the attachment plates 25, 27 and grommets 3 together as shown in FIG. 1. During assembly, after passing through the holes 26 in the bottom attachment plate 25 and bolt holes 17 in the grommets 3a, 3b and coming out the other end, the bolts 21 connect to either the secured threaded receiver 28 in conjunction with the top attachment plate 27 or a nut supported on, or in conjunction with the top plate 27 to complete the assembly of the framework.

Also as shown in FIG. 1, a receiver disc 52 may be inserted in the receiver 28 to provide both axial spring bias to the bolt 21 preventing the bolt 21 from loosening and also to keep the bolt 21 from being over-tightened so that the supported pipe is not gripped too tightly by the grommet which could limit the thermal contraction and expansion of the supported pipe as described in further detail below. The attachment plate 27 includes a hanger attachment receiver 30 which may connect to a hanger rod (not shown) or a hanger rod may be welded to the attachment plate, as part of a suspension assembly which supports the pipe support and pipe to a floor, ceiling, wall or other structural feature in a facility. The top and bottom attachment plates 25, 27 are pulled essentially flush against the grommets' top surfaces 7 when the bolts 21 are tightened in the receiver 28 or nut.

Figure 4:
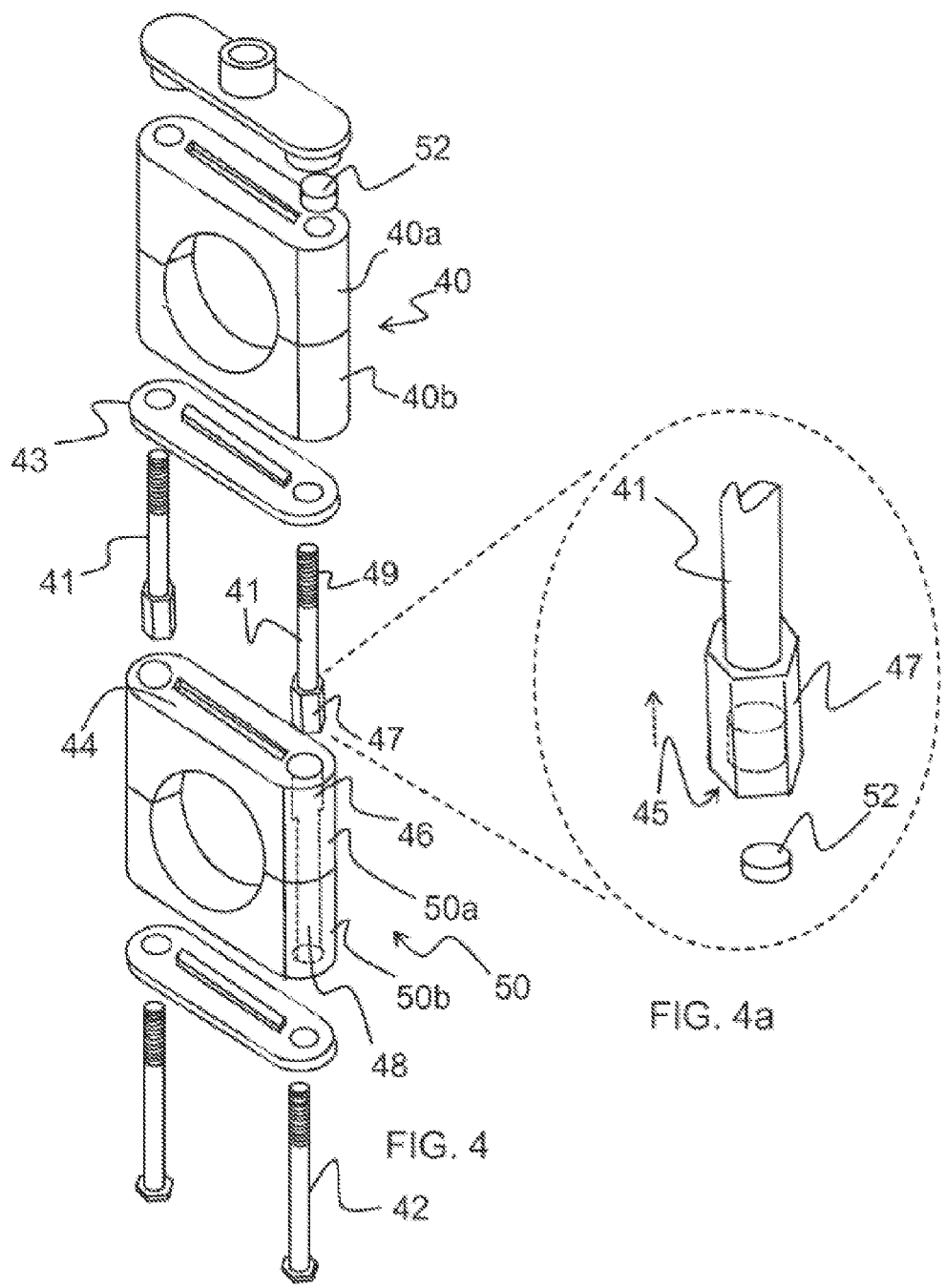
FIG. 4 shows an isometric assembly view of stacking the grommets of the present invention.

The inclusion of a protrusion or key 19 in the attachment plates 25, 27 which corresponds to the detent or slot 18 on the surface of each grommet as discussed above not only aligns the grommet 3 with a respective top or bottom plate 25, 27 but also maintains grommets 3 in planar and axial alignment with the attachment plates 25, 27. This can be particularly helpful in preventing the pulling of the grommet 3 away from the framework along the pipe axis P' due to axial movement of the pipe as supported by the apparatus through the passage O. It is to be appreciated that pipes are subjected to both axial and radial forces from fluids and gases passing through the pipes. Axial forces in particular tend to move the pipe along its pipe axis P' in one direction or the other. In this manner the pipe P actually is intended to slide somewhat relative to the curved inner surface 9 of the opening O of the grommet block 1. When the pipe P does not completely slide along the curved inner surface 9, in other words, the pipe P may stick somewhat to the curved inner surface 9 by friction due to the weight of the pipe or, alternatively the tolerance of the opening O relative to the O.D. of the pipe, the axial force and movement of the pipe P can pull the grommets 3 in the axial direction and away from the attachment plates 25, 27. This is what is known as "creep", where the grommet block 1 tends to creep away from the supporting framework due to the axial forces of the pipe P. The slot 18 and protrusion 19 arrangement formed in the attachment plates 25, 27 and respective lower 3b and upper 3a grommets form a secure fit and connection between the attachment plates and the grommets preventing axial creep. The slot 18 and protrusion 19 arrangement also assist in appropriate alignment and stacking arrangements of the grommets 3 as seen in FIGS. 1 and 4. A further description of such stacking arrangements is provided below.

Figure 2:
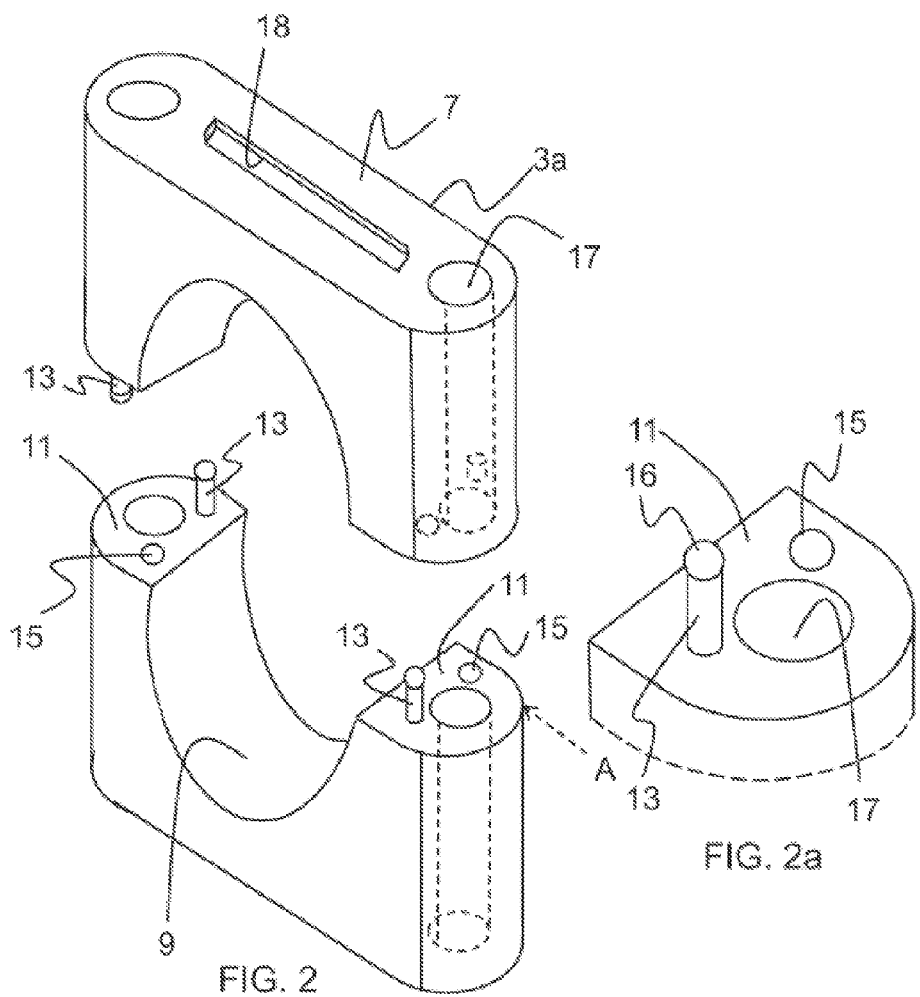
FIG. 2 shows an isometric view of the unattached grommets of the present invention.

FIG. 2 is an isometric view of the grommets 3 including the upper grommet 3a and the lower grommet 3b, separated from one another along the grommet separation plane A. As shown, the planar end surface 11 of each of the upper and lower grommets 3a, 3b illustrate a connection and stabilization system as to how the grommets 3 connect to form the stabilized grommet block 1, including in one embodiment a post 13 and port 15 on each of the planar end surfaces 11. The mating planar end surfaces 11 of the grommets 3 permit the upper and lower post 13 and port 15 of the grommets 3a, 3b to be essentially snap-fit and/or frictionally connected together in a manner that allows the grommet block 1 to hold together without the framework around it. Where the upper and lower grommets 3a, 3b are held together in this manner, the grommet block 1 can be self-supporting on and around a conduit without any additional hardware or attachment fixture. This aspect of the current invention—to simplify the installation and hanging process of the entire pipe hanger—is very important since the ability to connect the upper and lower grommets 3a, 3b around a pipe P so that the entire grommet block 1 is supported on the pipe or tube without any additional assistance from the installing personnel, frees the hands of the installer so that the installer can use both hands to complete attachment of the framework and the installation process.

The apparatus and method of the present invention also provides a safer process because it reduces the number of parts that the installer must concurrently handle and helps to prevent metal hardware from being dropped and falling. The simple attachment of the grommet block 1 to the conduit P without manual assistance after the upper and lower grommets 3a, 3b are fastened together by the respective post and port 13, 15 provides a stable situation for installing the accompanying hardware and framework. The connection of the two upper and lower grommets 3a, 3b is achieved through an interference fit, compression fit, snap fit or other frictional type connection between the relative posts and ports 13, 15. In one embodiment, the diameter of the ports 15 are made similar to, or even slightly smaller than the diameter of the posts 13 so that the posts 13 are securely and frictionally held after being inserted and pressed into the ports 15 due to the relative differences in diameters of the posts 13 and ports 15. This difference in relative diameter size of the posts and/or ports is such that an installer can, by manual force, push the posts 13 and ports 15 of the mating upper or lower grommet 3a, 3b into one another and form the grommet block 1 around the conduit P. This provides a secure and self-supporting connection for the grommet block 1 until the metal hardware of the framework is connected.

The attachment posts 13 can be made in any shape that would allow for a proper interference, friction or compression fit, such as smooth, ribbed, or even barbed. They can also be of any diameter or shape although cylindrical may be preferred. Similarly, the attachment ports 15 can be made in any corresponding size and/or shape that would provide a secure connection with the chosen posts 13. The posts 13 can also be made to allow easy initial alignment and entrance with the ports 15 by rounding or angling the free end 16 of the post 13 narrower than the rest of the post 13, as shown in FIG. 2a. The posts 13 and ports 15 should be sized such that there is a secure fit between the two upper and lower grommets 3a, 3b when pressed together and should provide sufficient frictional resistance so that the connection will not be lost unless some external force is applied, such as the manual force of the upper and lower grommets 3a, 3b being pulled apart. The height and depth of the respective posts 13 and ports 15 should be made in a relative manner so as to allow the connection surfaces 11 to touch when the upper and lower grommets 3a, 3b are fully engaged so that the metal hardware of the framework is readily attached and tightened on the grommet block 1.

Figure 3:
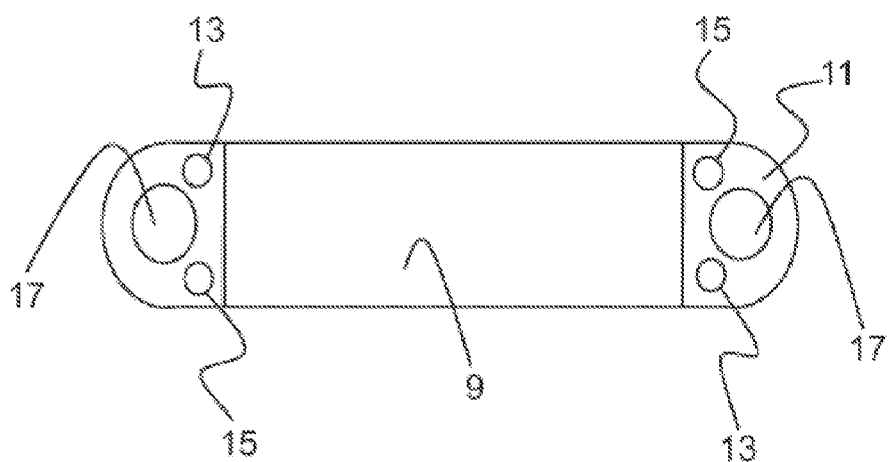
FIG. 3 shows a plan view of the connection points of the grommet of the present invention.

FIG. 3 is a planar view of the bottom of the grommet 3 of the present invention illustrating the location of the posts 13 and ports 15. One end of the grommet 3 consists of a post 13 and a port 15 equally and oppositely spaced in both distance and angle from the bolt hole 17. The opposite end of the grommet 3 consists of an oppositely disposed configuration of the post 13 and port 15. This view also shows that the arrangement of the post 13 and port 15 locations do not interfere with the bolt hole 17. The oppositely disposed configuration has the advantage of adding to the efficiency of connecting the grommets 3 to each other because the connection will work whether it is in the method shown in FIG. 2 or whether one of the grommets 3a, 3b is rotated 180 degrees.

FIG. 4 is a modified form of the present invention that takes into consideration the necessary stacking of grommet blocks with one another. In this embodiment an intermediate receiving bolt 41 and an intermediate frame plate 43 are provided to link the top grommet block 40 with a lower grommet block 50. The intermediate receiving bolt 41 is provided with a receiving cavity 45 in the head 47 of the intermediate receiving bolt 41 as shown in FIG. 4a for receiving the threaded end of a conventional bolt 42, or the threaded shaft of another intermediate receiving bolt 41. The inset grommet 50a of the lower grommet block 50 has a bolt head receiving cavity 46 within the bolt passage 48 for receiving the head 47 of the intermediate receiving bolt 41 to allow contiguous contact of the intermediate frame plate 43 with the upper surface 44 of the inset grommet block 50a. In this way, any number of grommets blocks may be stacked together to accommodate the alignment and support of multiple pipes.

The bolts 41 must be securely tightened in each of the receiving cavities 45 to provide enough compression of the elastomeric material of the grommet to prevent the pipe P within the grommet 50 from vibrating. The vibration may occur as fluids flow through the pipe, or as pumps start and stop, valves open and close or other surges occur within the fluid conduit and may over time cause failures of flanges or pipe connectors causing a safety hazard. The pipe or conduit may also be subject to thermal expansion if used to deliver hot liquids or steam for sanitizing the inner surfaces of the conduit or other work areas. It is therefore important to both ensure that a secure fit is made around the supported pipe or conduit to secure against such vibrations without over-tightening the hanger i.e. the grommet, so that the pipe or conduit is not impeded from thermal expansion and contraction The elasticity of the grommet material under the correct amount of compression ensures that the ID of the grommet adheres to the pipe or conduit without allowing gaps to form between the conduit and ID of the grommet block 50. However, if the bolts 41 are over-tightened as is quite possible with an elastomeric or polymeric block, deformation of the grommet can occur as well as too much pressure from the grommet on the supported pipe or tube to permit appropriate thermal expansion. Alternatively, the thermal expansion and contraction could compromise the integrity of the grommet and hanger support eventually leading to failure.

As shown in FIG. 4a to properly secure the bolt 41 within the receiving cavity 45, an elastomer, polymeric, foam or metallic receiver disc 52 may be placed in the receiving cavity 45 to allow the end of bolt 41 to press into and against the biasing surface of the elastomer, polymer, foam or metallic 52. The bias of the disc 52 helps lock the bolt 41 within the receiver 45 and also acts as a stop preventing the over-tightening of the bolt 41 in the receiver 45. In this manner a sufficient tightening of the bolt 45 can occur so that the grommet grips entirely around the supported pipe or tube but ensures that the bolt 41 is not over-tightened so that the grommet is deformed or squeezes the pipe so tightly that thermal expansion is prevented. It is to be appreciated that this disc 52 may be another springable/compressible material besides an elastomer and does not have to be exactly circular as the disc, but must fit within the receiving cavity 45. The locking in of the bolt 41 in the receiver 45 keeps the elastomeric material of the grommet 50 compressed and snugly secured around the conduit reducing vibration effects on the pipe and tube support itself. The compression fit of the bolt 21, 41 by the bolt channels 17, 48 and elastomeric disc 52 aids in preventing the bolt and other hardware from falling out and into or on a work area or manufacturing process. The disc 52 also keeps the bolt from overtightening and limiting thermal expansion of the supported line. It is also to be appreciated that the same stop feature of the disc 52 can also be accomplished by ending or deforming the threads of the bolt 41 and receiving cavity 45 at a desired location so that no further threaded engagement of these elements can occur beyond a certain point. This feature is important in most industrial assembly line processes and critical in the food or drug industry for work area safety so that thermal expansion and contraction does not compromise and cause premature failure of the pipe supports.

Figure 5:
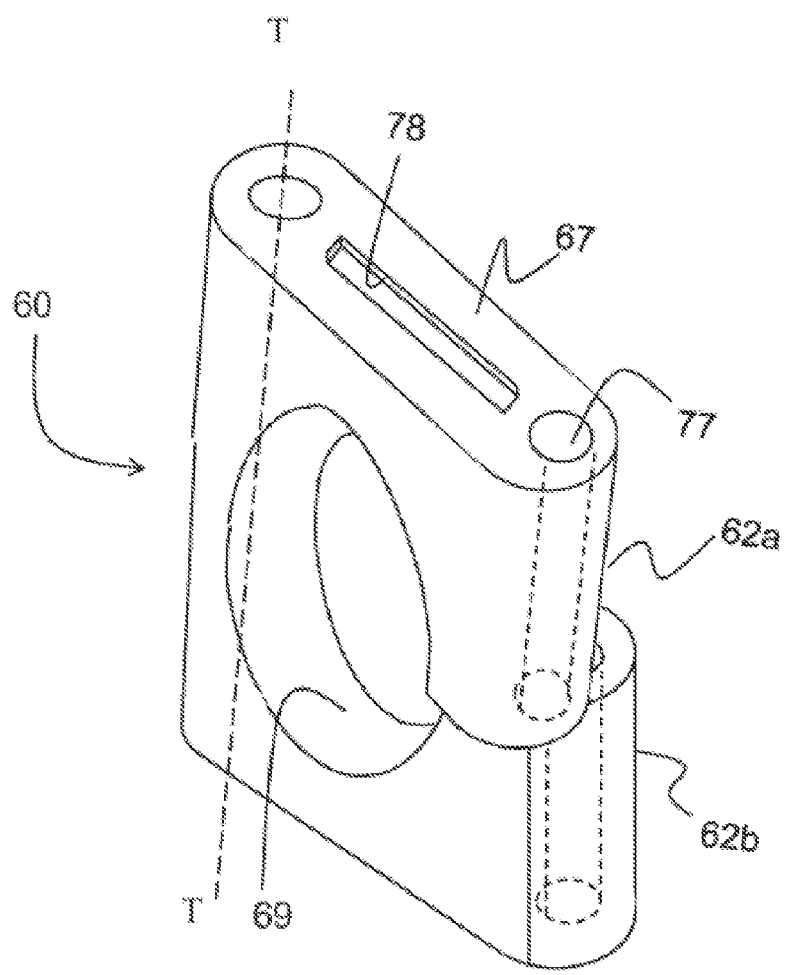
FIG. 5 shows an isometric view of the elastomeric grommet block in a flexed position about a torsional axis.

FIG. 5 is an isometric view of another embodiment of the grommet wherein the grommet is a single block made from an elastomeric material. In this embodiment, the elastomeric grommet block 60 can be flexed or twisted about a torsional axis T to provide a large enough separation between a first flange 62a and a second flange 62b to be able to fit the pipe passage O of the grommet block 60 around a pipe, tube, or conduit P. The grommet block 60 is of sufficient flexibility to separate and surround the pipe P, and of sufficient rigidity to reform to original dimensions and contours in order to securely grip around the pipe, tube or conduit P. In this way, after attachment of the grommet block 60, the bolt holes 77 are properly aligned to assist in the insertion of hardware to secure a framework to the grommet block 60 around the pipe P. Here, with a substantially more flexible elastomeric bock 60, there is a tremendous potential for creep due to the axial loads as explained above so the anti-creep cleat features 78 of the block 60 become increasingly important to ensure there is no failure of the grommet 60 and pipe support product.

In another embodiment of the present invention shown in FIGS. 6-10 a further improvement to the grommet is shown where flat face surfaces of the grommet 80 are replaced with a face surface 92 having instead a gradual slope away from the inside edge of the grommet 80 defining the circular opening O. The slope extends from a highest point at the inside edge 93 of opening O and radially outwards to a relative slightly lower point at the outside edges 94 of the grommet 80. The radially outwardly depending slope can be in the range of 0.5-10 degrees and other ranges which facilitate the run-off of liquid and debris. Better shown in FIGS. 7-8, from the inside edge 93 the face(s) 92 (shown here as top and bottom faces 92 and 92') the face 92 slopes radially outward and down from the opening O towards the outermost edges 94 of the grommet 80. The faces 92, 92' can also be described as truncated cones or conic sections with the smaller radius top of the cone being defined by the edge 93 and opening O and the base of the cone being essentially the outer edges 94 of the grommet 80. The radial slope depends circumferentially around the entire grommet, i.e. around the entire diameter of the opening O so that the entire surface defined by the faces 92, 92' are sloped from the opening O to the outer edges 94 of the grommet 80.

Figure 9:
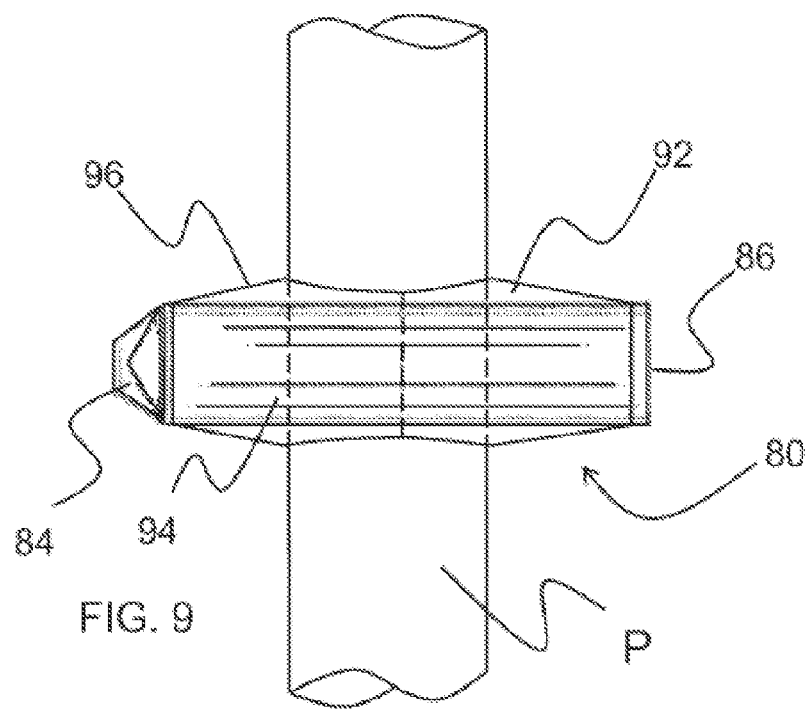
FIG. 9 shows a side view of the further embodiment with sloped features and a horizontally aligned conduit.
Figure 10:
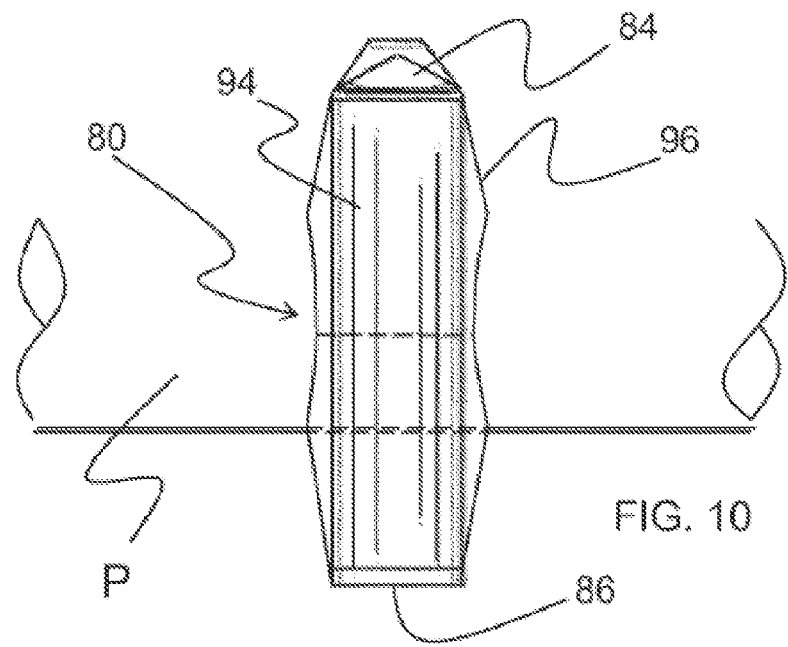
FIG. 10 shows a side view of the further embodiment with sloped features and a vertically aligned conduit.
Figure 11:
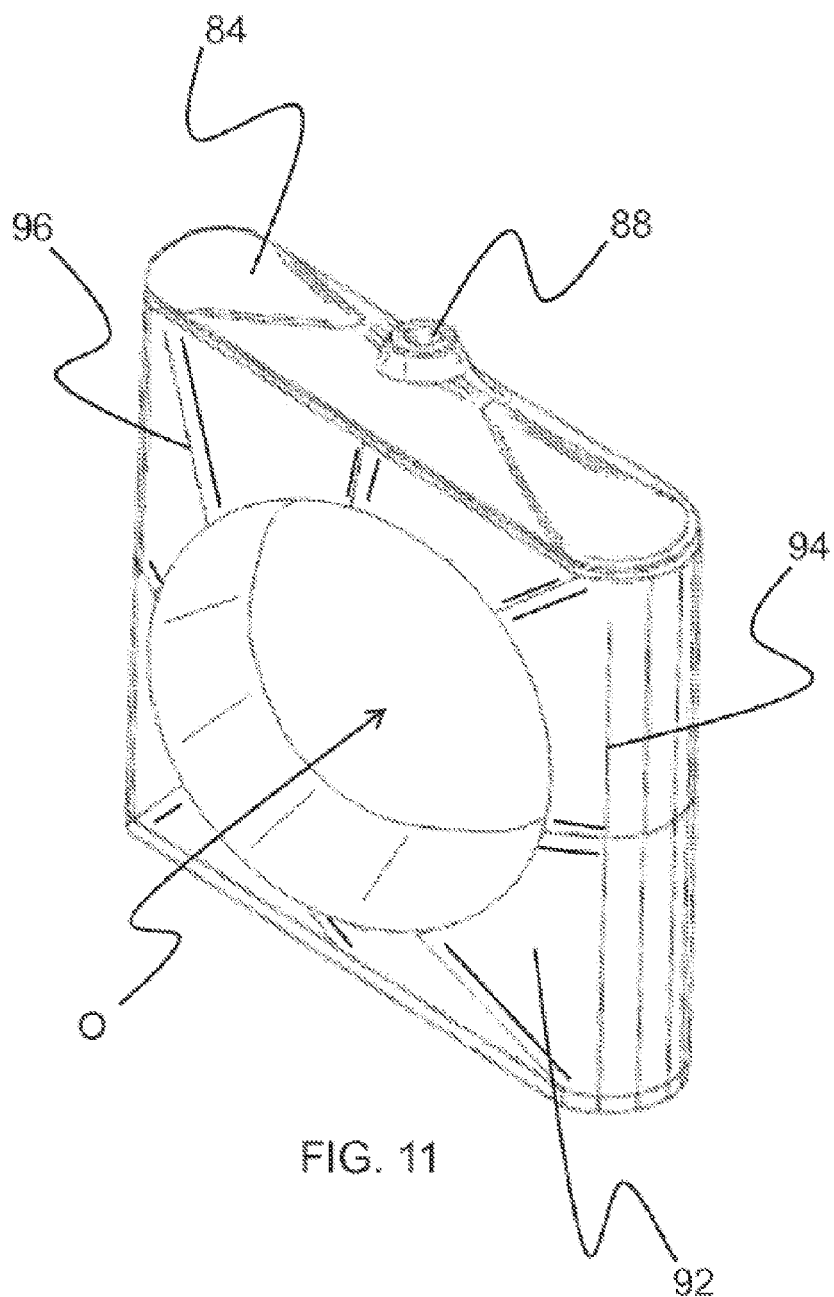
FIG. 11 shows a perspective view of the further embodiment having sloped features.

This arrangement is particularly important in cases where a vertical pipe or line is supported by the pipe support. In such cases as shown in FIG. 9, the pipe support and grommet 80 are substantially horizontally positioned to engage the vertical pipe P or line, so that one of the faces 92 is facing upwards and presents a surface which could hold liquid or other contaminants on the support. In other words, in supporting a vertical pipe P the horizontal face 92 of a flat faced grommet 80 may act as a collector for dust and debris, In the present embodiment however, by gradually sloping the face 92 away from the pipe passage opening O to the surfaces edges 94, liquid, dust and debris are directed away from the pipe P and off of the grommet surface 92. Critically, even in the case of a horizontally aligned pipe support as shown in FIG. 10, there are no flat, i.e. horizontal, surfaces which could hold liquid or contaminants. The surface 92 may be subdivided into one or more sections by forming subtle ridges 96 between each section or into channels to direct flow away from the conduit as shown in FIG. 11. The substantial removal of all flat surfaces from the grommet 80 allows the grommet to be positioned to support either a vertical or horizontal pipe or conduit without the collection of unsanitary debris.

Also in the embodiment shown in FIGS. 6-10, the attachment plates 84, 86 form a framework that is secured around the grommet 80 by the bolts which extend through the attachment plate holes 26 and bolt holes 17 of the grommets as previously described. Also as previously described the bolts 21 connect to a threaded receiver 28 (as shown in FIG. 1) on a bottom portion of the attachment plate 84. The attachment plate 84 may include a hanger attachment receiver 88 for connection to a hanger rod (not shown) as in FIG. 8, or there does not have to be such a receiver 88 as in FIG. 7 on the top plate 84. The receiver 88 may be threaded or may be merely a collar to which is welded a hanger rod. The top and bottom attachment plates 84, 86 are pulled essentially flush against the grommets' respective top and bottom surfaces when the bolts 82 are tightened in the receiver 28.

Figure 6:
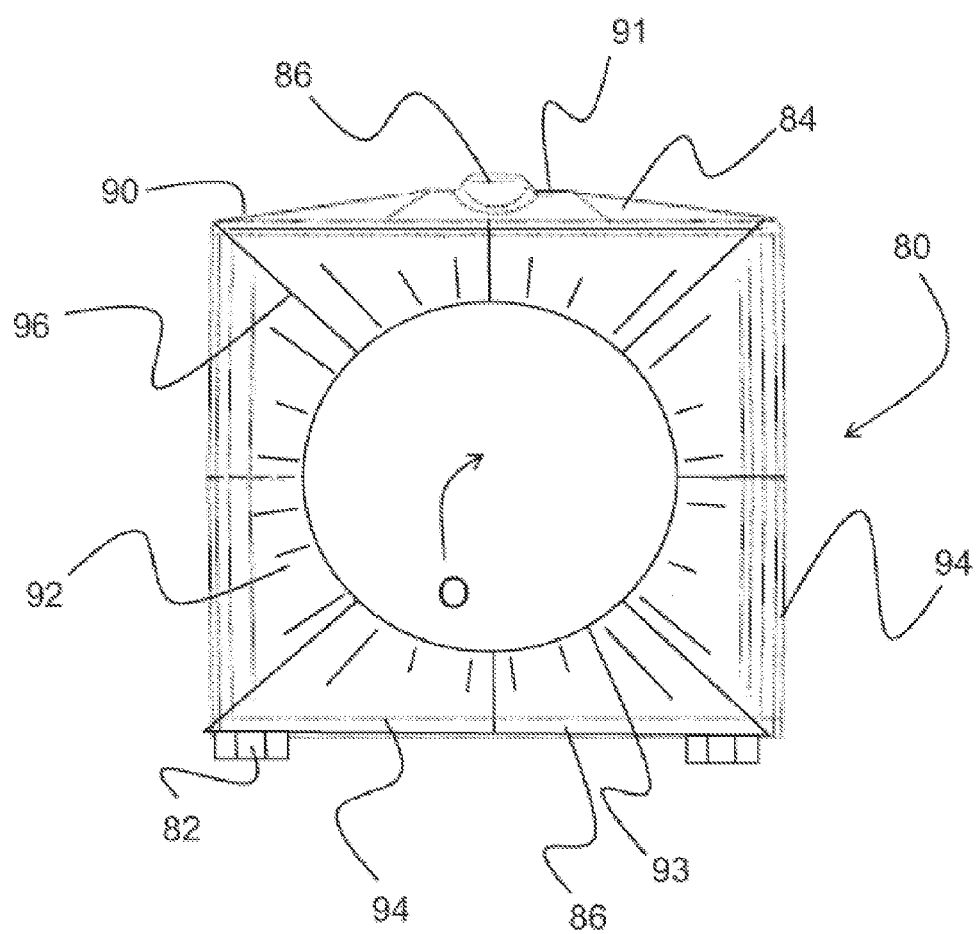
FIG. 6 shows a plan view of a further embodiment of the present invention having sloped features.
Figure 7:
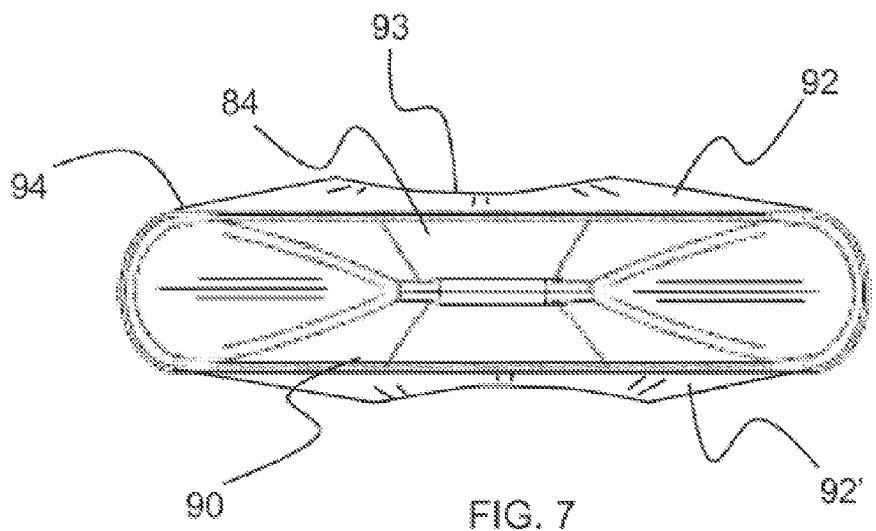
FIG. 7 shows a top view of the further embodiment with a substantially pyramid shape with sloped features.
Figure 8:
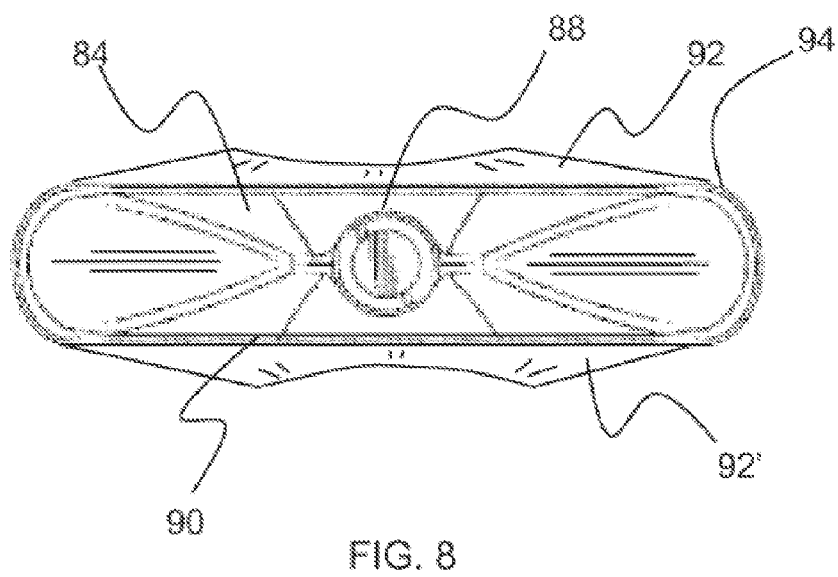
FIG. 8 shows a top view of the further embodiment with a substantially cone shaped with sloped features.

As best seen in FIG. 6, the top plate 84 which secures the grommet 80 between the top plate 84 and the bottom plate 86 of the grommet 80 is sloped to form a pyramid or cone shape that extends from a higher central portion 91, which may or may not have the receiver 88, downward to a lower outer edge 90 of the top plate 84. As described above, the center portion may form a support connector to hang the grommet support from a vertical or horizontal wall or ceiling extension. This slope or conical shape of the top plate 84 facilities the removal of liquid, debris and contaminants from the top surface of the top plate 84 which will more easily run off of the slope than a flat horizontal surface.

In a further embodiment, a substantially hexagonally shaped pipe, tube and conduit support apparatus 110 is shown in FIGS. 12A-12D. This conduit support apparatus 110 includes first and second angle brackets 112 that when attached around a pipe, tube, or conduit 114 forms a substantially hex shape hanger support. The support apparatus 110 has opposing grommet blocks 116 fabricated from a relatively soft more elastomeric material such as a polymeric material, for example plastic, silicone, or PVC which cooperate with the angle brackets 112. The grommet blocks 116 are formed such that in combination and cooperation with an appropriately dimensioned stamped angle bracket 112, the support apparatus 110 is provided with an outer substantially hexagonal shape and defines an inner pipe passage that conforms and adheres around a pipe or conduit 114. The conduit or pipe 114 extends through the pipe passage along axis X, and as shown in FIG. 12A is directly supported by an inner diameter of the grommet blocks 116. The grommet blocks 116 dampen and insulate the supported conduit 114 in the conduit support apparatus 110 as described above.

The shape and configuration of the grommet blocks 116 is important to reduce and eliminate flat surfaces where debris can build up. As best observed in FIGS. 12A and 14A the grommet blocks 116 have rounded or sloped outer edges 118 which transition the sidewall 119 of the block 116 to an upper surface 130 of the grommet block 116. The sloped outer edges 118 provide smooth contoured surfaces preventing bacterial build up and other contaminants, generally referred to herein as "debris", from collecting on the hanger support 110. The rounded outer edges 118 extend the length of the grommet 116 and are interrupted essentially by a depressed portion of the upper surface 130 of the grommet 116. This depression forms a channel 127 on the upper surface 130 of the grommet 116. The sloped outer edges 118 smoothly and consistently transition the grommet from an edge of the channel 127 around and down to intersect with the side surface 119 to provide for a smooth transition and run-off surfaces for spray cleaning in industrial facilities, especially as described above, those in which clean rooms, sanitary and sterile environments are critical to a manufacturing process. As will be described in further detail below, the channel 127 receives and frictionally grips the bracket 112 securing the grommet 116 to the bracket 112 for placement and installation on a pipe or conduit.

Figure 13A:
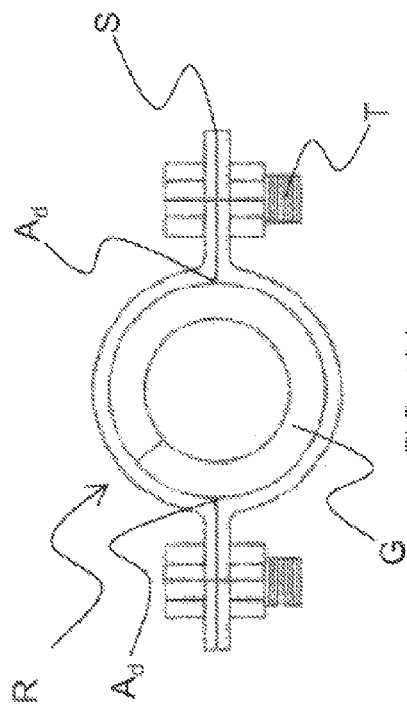
FIG. 13A is an embodiment of a hex type hanger support apparatus of the prior art.
Figure 13D:
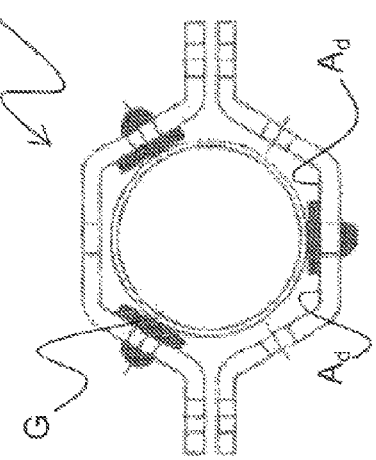
FIG. 13D is a further embodiment of a round type hanger support apparatus of the prior art.
Figure 13B:
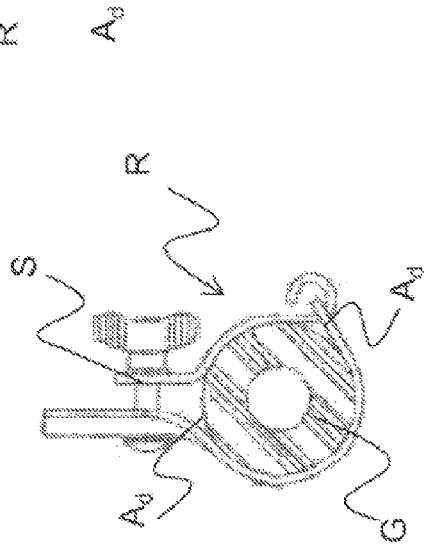
FIG. 13B is a further embodiment of a hex type hanger support apparatus of the prior art.
Figure 13C:
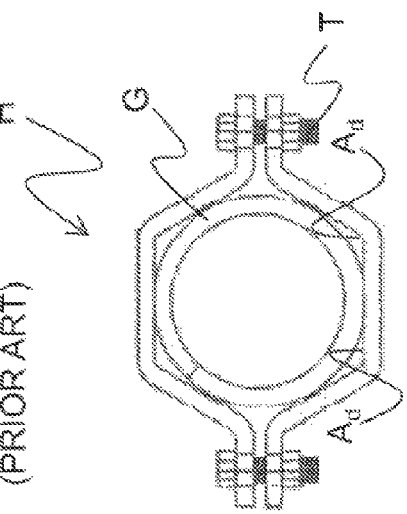
FIG. 13C is an embodiment of a round type hanger support apparatus of the prior art.

As shown in FIG. 12A-12D, standard round and hex angle hanger supports R and H from the prior art commonly use a round grommet G that completely surrounds the pipe as shown in FIG. 12A. The rounded grommet may be sectioned and/or apportioned around the pipe as shown in FIG. 12D. In placing the grommet only around the pipe numerous areas denoted as A$_d$ are available where debris and bacteria may collect. The prior art further shows a mating of the metallic surfaces S of a first and/or second bracket as shown in FIG. 13A or a mating of the bracket with a bolt or other hardware support as shown in FIG. 13B limiting the amount of adjustment in tightening that may be made for each bracket around a pipe. The prior art further shows exposed threads T where wiping or spray cleaning may not effectively remove dirt or debris from crevice and gap areas.

As seen in FIGS. 12A-12D of the present invention, the grommet 116 is formed to mate with the hex support angle bracket 112. As best seen in FIGS. 14A-14E the outer surface 130 of the grommet 116 defines the channel 127 with dimensions matching the width and edge height dimensions of angle brackets with a first bolt support portion 131, a first sloped or angled portion 132, a center portion 133, a second sloped or angled portion 134 and a second bolt support portion 135. Each surface portion is contoured with the rounded edges 118 that extend up from the side surface 119 and have a sloping curvature to intersect with and form the sides of the channel 127 in which the bracket 112 is eventually placed and secured. A rib 128 is formed along the inner edge of the channel 127 to secure a bracket 112 in place and to remove voids or gaps between the grommet 116 and bracket 112. As seen in FIG. 14E, the channel sidewalls which depend down to form the inner edge do not have to be formed at a 90 degree angle to the lower surface of the channel 127. The inner edge may have, or be formed with a reverse chamfer for example which forms the rib 128 and the chamfer may have a constant slope or have a radius of curvature as shown by the alternative dashed line in FIG. 14E. This feature is important to provide sufficient contact between the grommet 116 and the angled brackets 112 and to limit gaps or spaces between the two elements so that debris cannot become lodged in such gaps or spaces in the support 110.

The grommet 116 has lower surface portions 137, 139 between which is a rounded center portion 138 defining an inner diameter portion of the grommet 116. This inner diameter (I.D.) is properly dimensioned generally to the outside diameter (O.D.) standard tube, pipe and conduit diameters. The lower surface portions 137, 139 extend out on either side of the inner diameter portion to accommodate the bolt supporting portions of the support 110.

The rounded edges 118 extend to a point substantially level with the upper surface of the bracket 115 thereby forming a smooth transition of the surface 115 of the bracket 112 with the rounded edge 118, and without forming crevices or gaps there between. The grommet rib portion 128 facilitates securing the bracket 112 within the grommet channel 127 aiding an installer where the installer does not have to hold both the bracket 112 and grommet 116 in place, but simply hold the bracket 12 with the grommet 116 as a pair and mate the bracket 12 with the grommet 116 with a second grommet 116 with a bracket 112 around the pipe or conduit and secure the pieces using appropriate tools hardware. Once secured, any voids or gaps between the angle bracket 112 and the grommet 116 are removed thereby reducing the potential for dust, debris, bacteria or cleaning solution to collect or puddle.

Figure 15:
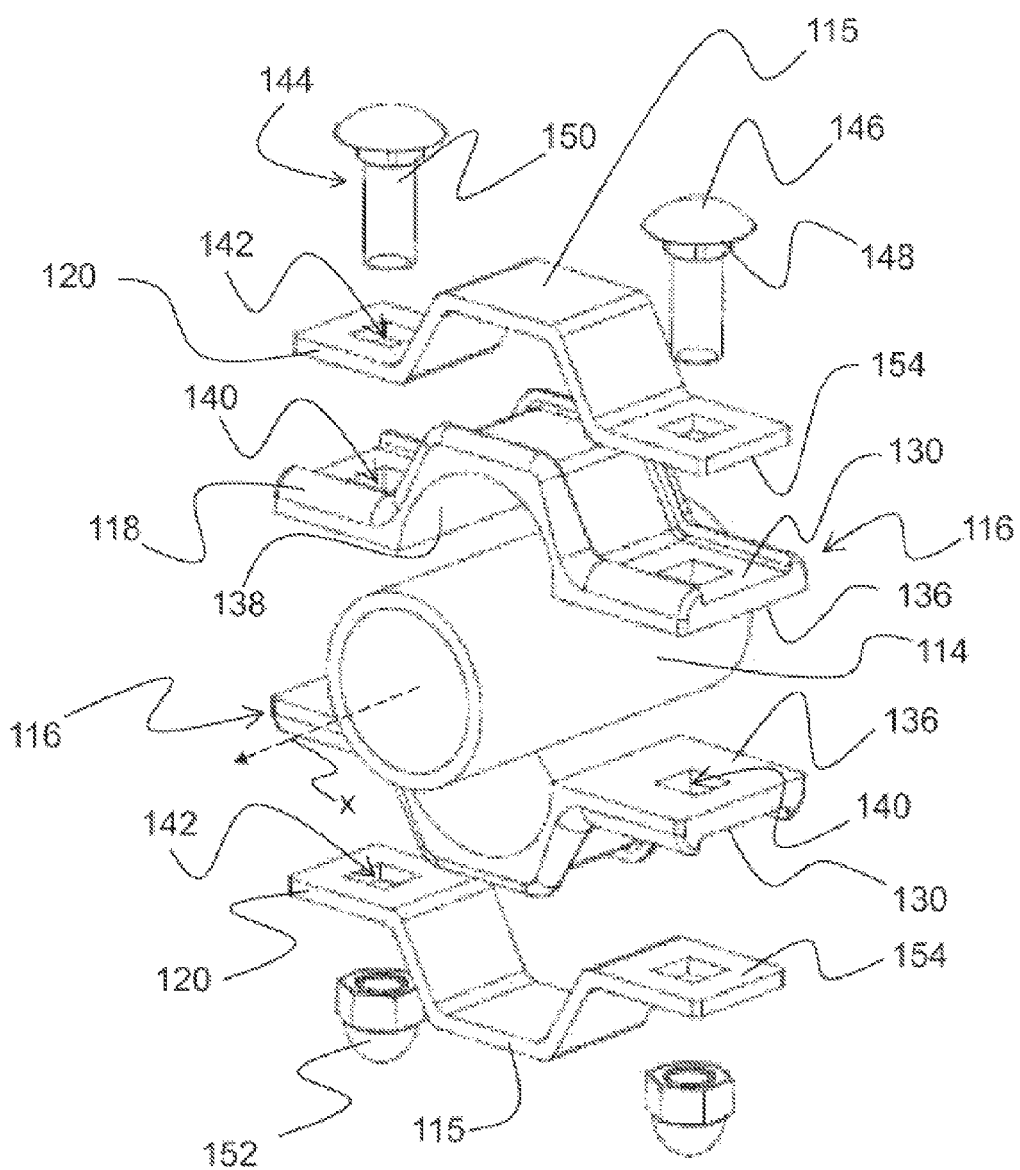
FIG. 15 is an exploded perspective view of the first embodiment of a hex type hanger support apparatus of the present invention.
Figure 16:
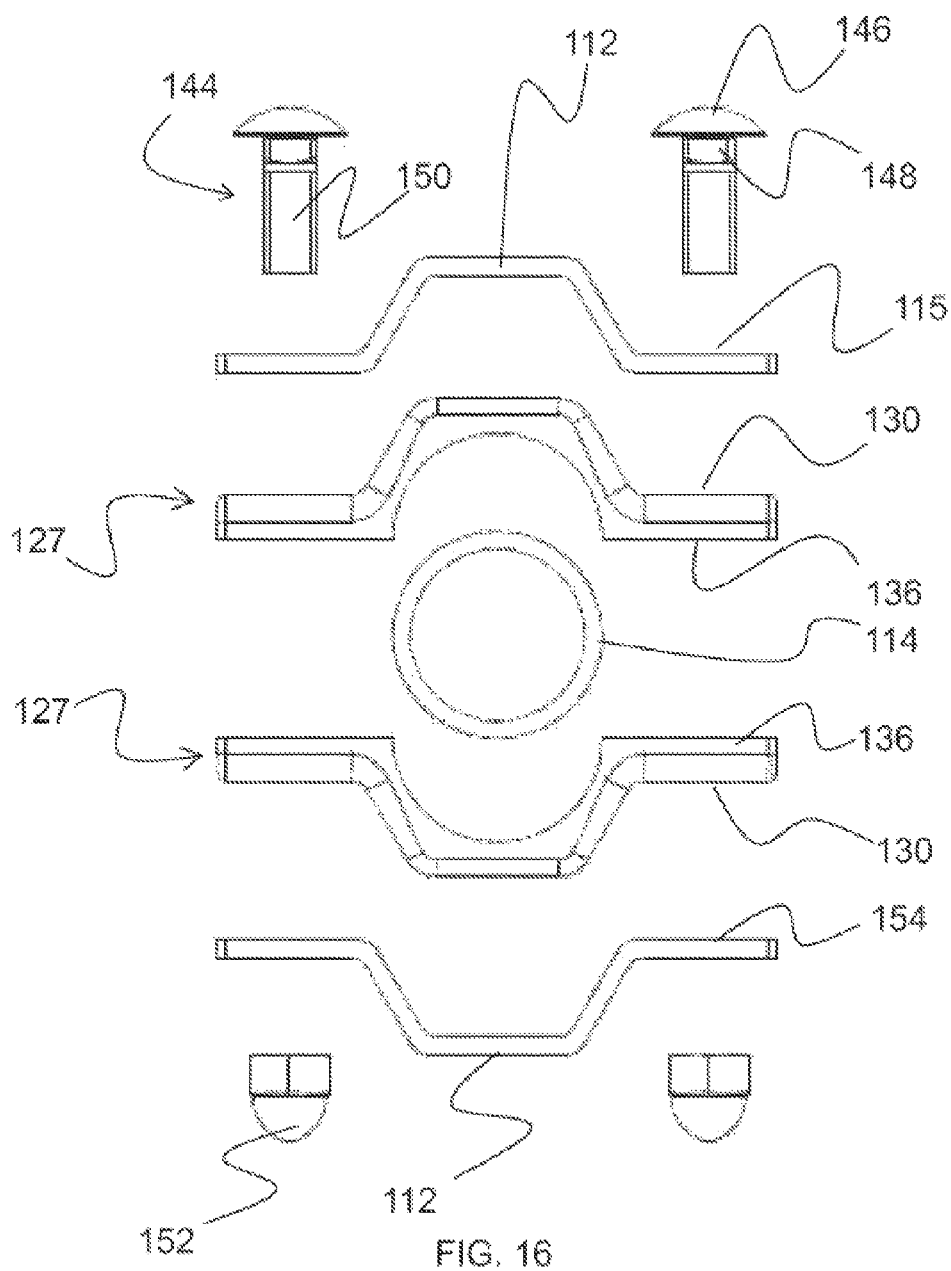
FIG. 16 is an exploded planar view of the first embodiment of a hex type hanger support apparatus of the present invention.

Appropriate tools and hardware or other securing or attachment mechanism may be used to secure the hanger support apparatus 110 to a pipe or conduit 114, however in a preferred embodiment, as shown in FIGS. 14A and 14B, square openings 140 may be formed in the grommet 116 at similar dimensions as the bolt holes 142 of the angle bracket 112 to allow for carriage bolts 144 to be placed in and through the holes to secure a first angle bracket and grommet with a second angle bracket and grommet around the pipe 14 as shown in exploded views in FIGS. 15 and 16. The carriage bolt 144 may have a rounded cap 146, square neck 148 and threads 150 that extend through the first bracket 112 and grommet 116 and the second grommet 116 and bracket 112. The square neck 148 of the carriage bolt 144 provides for the use of only one wrench as the square neck 148 of a first end of a bolt 144 is prevented from turning by the bolt hole 142 in the stamped angle bracket 112 and the square opening 140 in the grommet 116 as a cap nut 152 is secured to a second end of the bolt 144.

In this further embodiment of a support conduit 110, the length of threads 140 of the bolt 144 may extend minimally through the first and second bracket 112 and into the cap nut 152 with minimal receiving threads in the cap nut 152 and thereby tightly securing the grommet 116 around the pipe acting as an anchor to restrict motion and vibration of the pipe. An elastomeric, polymeric, foam, rubber or even a metal or steel receiver disc (not shown) may be formed to fit within a threaded receiver 152 of a nut. The disk material as described above is selected to match the supports/hangers applications environment. The receiver disc is forced to the bottom of the receiver 152 by the insertion of the bolt 144 and provides essentially a spring bias to the bolt 144 which allows the bolt 144 inserted into the receiver 152 to bottom out against the disc surface and compress the disc against the bottom of the receiver 152. The disc provides axial spring bias between the bolt 144 and the receiver 152 for controlling axial expansion and contraction which can affect the threaded radial and axial relationship of the bolt 144 and receiver 152. The elastomeric disc helps prevent loosening, or backing out, of the bolt 144 while ensuring that the bolt 144 is stopped and not over-tightened so that the grommet 116 does not squeeze the pipe or tube 114 too tightly while allowing the expansion or contraction of the supported utility line. The elastomeric disc allows the bolt 144 to seal against the disc and compress the disc in the receiver and create an internal biasing effect like that of a common external lock-washer which ensures that a continual snug fit of the grommet insert 116 around the pipe or conduit 114 is maintained, while ensuring there is sufficient room for the pipe, tube or supported line 114 to expand and contract while also greatly limiting pipe vibration and reducing the safety hazard of separation of a pipe support.

In further embodiments, the grommet 116 may function as a guide allowing for line expansion and contraction while producing a snug fit that greatly reduces vibration of the conduit. In high flow liquid piping at high temperatures, flow characteristics and temperature changes can cause repeated expansion and contraction causing gaps and crevices for debris. A proper adjustment of the carriage bolt 144 using longer dimensioned threads 150 so that the bolt end does not bottom out into a cap nut 152 allows for movement in the bolt 144 as thermal expansion and contraction occurs, while still snugly securing the grommets 116 to and around the pipe 114. In this configuration, the support 110 is acting as guide, so that vibration and noise is reduced as flow characteristics within the pipe 114 change. The carriage bolts 144 may be color coded to denote the bolt as an anchor or a guide with for example a first color bolt cap 146 and receiving nut 152 denoting an anchor support and a second color bolt cap 146 and receiving nut 152 denoting a guide support. The rounded cap 146 of the first end of the bolt 144 and an acorn style cap nut 152 enclosing the threads 150 of the bolt removing gaps and crevices and provides rounded surfaces that may be easily wiped of spray cleaned reducing debris and contaminant build up.

The grommets 116 may come in standard round or angle bracket shapes with round center portion matching standard tubing sizes such as from 2.54 cm-15.24 cm (1 inch-6 inches). The lower surface area 154 of a first angle bracket 112 mates and is secured into the extended channel 127 of the outer surface area 130 of a first grommet. The soft elastomeric material of the grommet 116 completely extends over and around the bracket 112 providing for the inner surface area 136 of a first grommet 116 and the inner surface area 136 of a second grommet 116 to extend completely between the angle brackets 112 preventing contact of a first lower metallic surface 154 and second upper metallic surface 154 of the angle brackets 112. The first and second grommets 116 provide a buffer area for the adjustment of the compression of the angle brackets 112 without the risk of damage to the pipe or conduit 114. The rounded inner surface 138 of the grommet material 116 also completely grips around the pipe or conduit 114, removing gaps and a requirement to use wedges to tighten the fit or to resize the inner diameter of the grommet. The removal of gaps and wedges removes collection surfaces that could accumulate dust or debris. The grommet 116 further extends the rounded edges 118 of the grommet out and around the bracket removing or diminishing flat surfaces that are areas of debris collection and providing for run off surfaces when hosing or spray cleaning a food, chemical, pharmaceutical or other sanitary manufacturing facility.

The grommet 116 of this embodiment of the present invention is mated to standard dimension round or angular hardware brackets normally attached around a tube, pipe or conduit 114. In a further embodiment, an extension rod 158 may be secured to the bracket 112 to suspend, support or align the tube, pipe or conduit from a ceiling, or along a wall, floor or other structure. The extension rod 158 as shown in FIGS. 17A-17D may extend perpendicularly from axis X along axis Y from a center portion 160 of the bracket 112. The extension rod 158 may be of any dimension and may be sized to accommodate the pipe as for example in a larger diameter to support the suspension of a pipe or conduit from a ceiling or in a smaller diameter as for example to align the pipe along a wall. A hanger nut 162 as shown in FIGS. 18A-18D may be affixed to the bracket to provide a connector for the extension rod 158. The hanger nut 162 may be formed from one or more components and may be of any adequate dimension to secure standard pipe sizes to the bracket. The hanger nut 162 may commonly be a cylindrical shape however in further embodiments the connector 162 may be in a cone or other shape having sloped surfaces to remove flat, horizontal areas where debris may collect and to facilitate run off of material during spray cleaning.

Figure 20A:
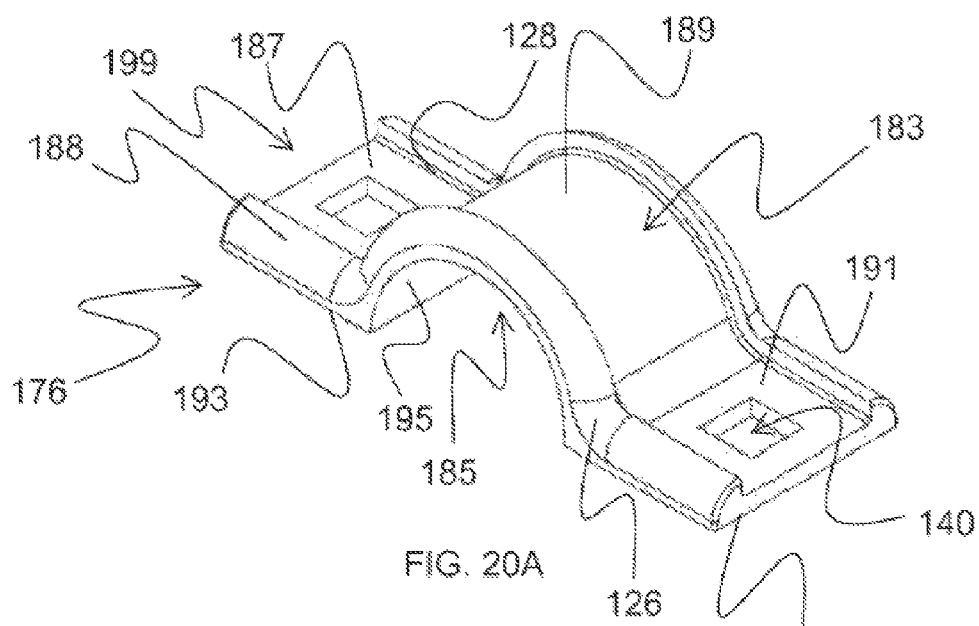
FIG. 20A is a perspective view of a grommet used with the first embodiment of a round type hanger support apparatus of the present invention.
Figure 20B:
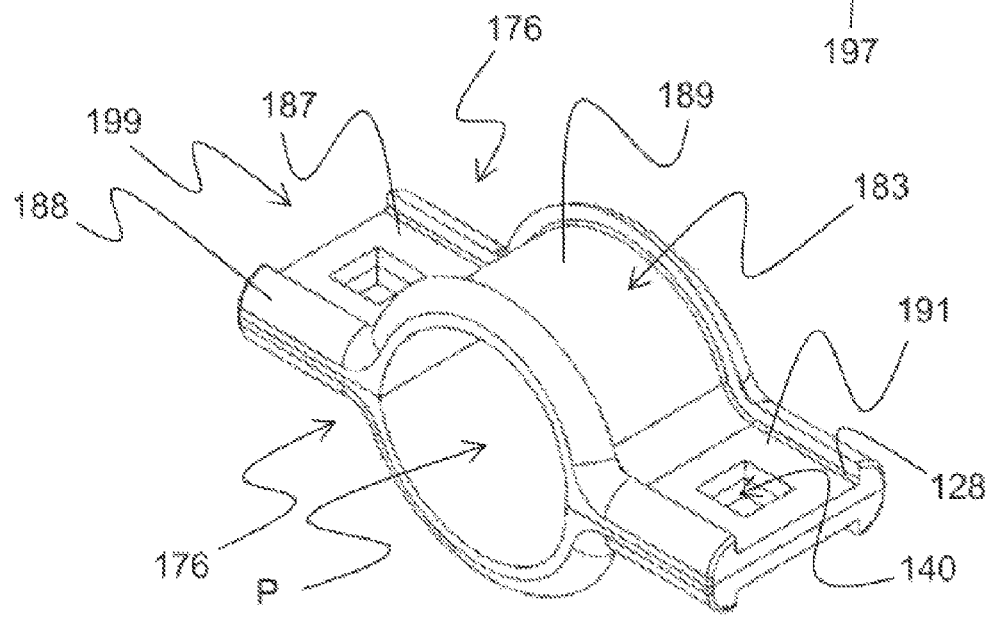
FIG. 20B is a perspective view of a first grommet mated with a second grommet used with the first embodiment of a round type hanger support apparatus of the present invention.

In a further embodiment, the present invention may be formed for use with a round type hanger support 170 as shown in FIGS. 19A-19D. In this further embodiment, the round type hanger support 170 may be formed from a first round section bracket 172 and round section grommet 176 mated to a second bracket 172 and second grommet 176 around a pipe 114. The bracket 172 may be formed from a metal strip having a first attachment or bolt support 180, a rounded portion 182 and a second attachment or bolt support 184. As shown in FIGS. 20A-20B, the rounded grommet 176 has an upper surface 183 and a lower surface 185, the upper surface having a first extension 187 mating with the first extension 180 of the rounded bracket 172, a rounded section 189 mating with the rounded section 182 of the bracket 172 and a second extension 191 mating with the second extension 184 of the bracket 172. The lower surface 185 has a similar first extension section 193, a lower rounded section 195 and a second extension 197 with each first and second 193, 197 extended slightly longer than the upper first and second extension 187, 191 to accommodate for the thickness of the grommet 176.

The upper surface 183 of the grommet 176 is formed with a channel 199 and rounded edges 188 that extend up and around the bracket 172 to a point even with the surface 190 of the bracket thereby forming a smooth transition of the surface of the bracket 172 down and around the grommet edge 188 as described above. The channel 199 has a chamfer or rib 201 as described above to remove gaps between the grommet 176 and the bracket 172 and help to secure the bracket 172 within the channel 199. A first grommet and second grommet may be mated together to form a pipe passage P as shown in FIG. 20B.

Figure 21:
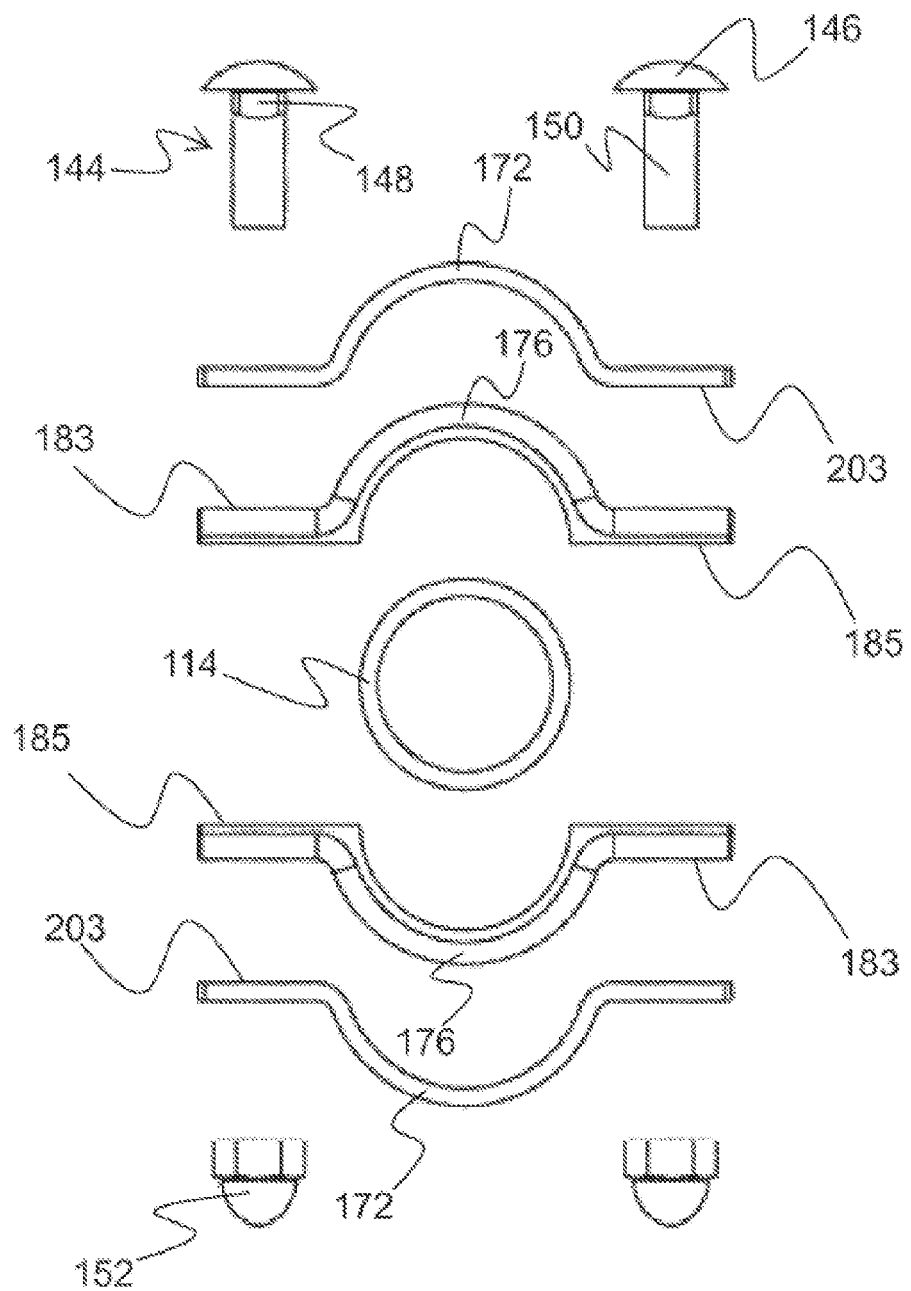
FIG. 21 is an exploded, planar view of a first embodiment of a round type hanger support apparatus of the present invention.
Figure 22:
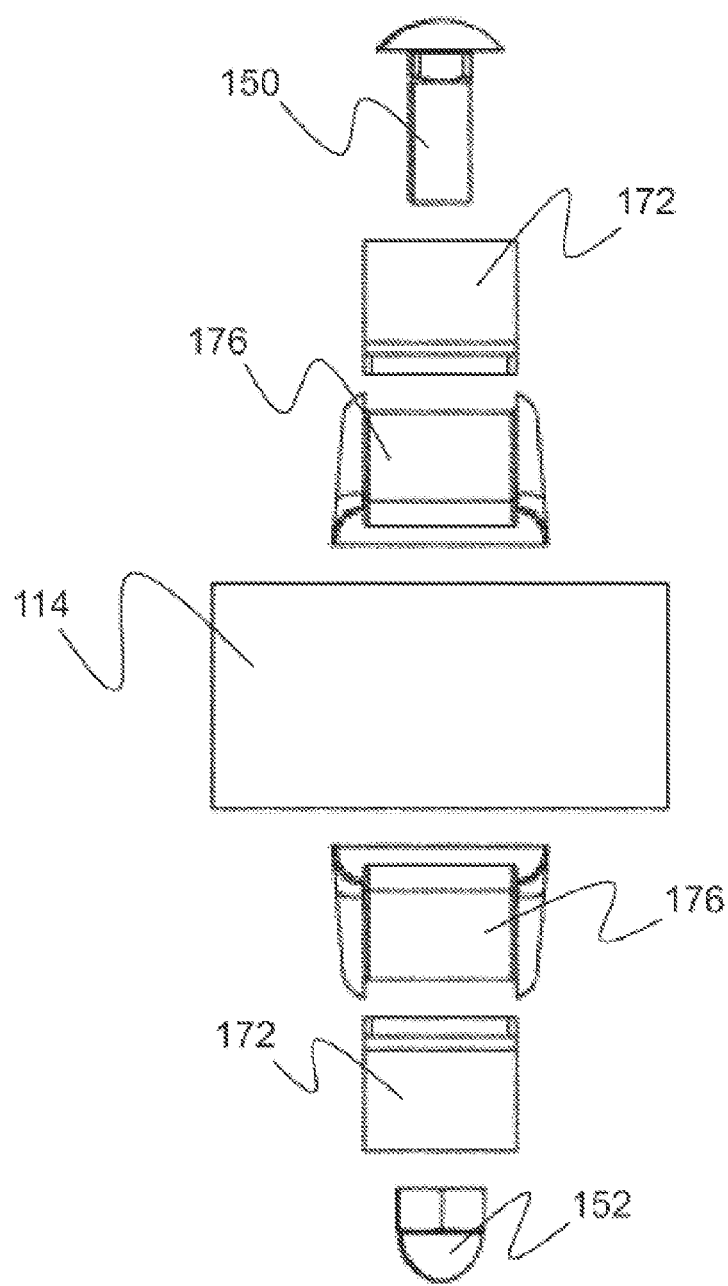
FIG. 22 is an exploded side view of the first embodiment of a round type hanger support apparatus of the present invention.

As shown in an exploded view in FIGS. 21 and 22, a lower surface 203 of a first bracket 172 mates with an upper surface 183 of a first grommet 176 and a lower surface 185 of the first grommet 176 mates with a lower surface 185 of a second grommet 176. An upper surface of the second grommet 176 mates with a lower surface of a second bracket 172 around a pipe or conduit 114. During installation, once the brackets are attached to and within the grommet channels 199, the bracket with grommet may be easily held and positioned around the tube, pipe or conduit, and the accompanying hardware can be installed. Using similar carriage bolts 144 having square necks 148 and acorn cap nuts 152, as described above, the grommet extension tabs provide for adjustment to the tightening of the grommet 172. Square openings 140 in the grommet 176 match the bolt holes 142 in the round bracket 172 providing for tightening of the brackets secured within the grommets around the pipe 114 using a single wrench making it much more efficient for the installer because they need only manipulate a single tool for installation. A foam disk or disk other soft elastomeric material as described above may be used within the cap nut 152 to bottom out the bolt 144 and secure the grommet tightly around the pipe, tube or conduit as an anchor as described above. Alternatively, a longer thread carriage bolt 144 may be used to loosen the grommet around the pipe to allow for thermal expansion or contraction of the pipe as described to use the hanger support as a guide.

In a further embodiment, an extension rod as described above may be secured to the bracket 172 to suspend, support or align the tube, pipe or conduit from a ceiling, or along a wall, floor or other structure. The extension rod may extend perpendicularly from a center portion of the bracket 172 and may be of any dimension and be sized to accommodate the pipe as for example in a larger diameter to support the suspension of a pipe or conduit from a ceiling or in a smaller diameter as for example to align the pipe along a wall. A hanger nut, as described may be affixed to the bracket 172 to provide a connector for the extension rod. The hanger nut may be formed from one or more components and may be of any adequate dimension to secure standard pipe sizes to the bracket 172. The hanger nut may commonly be a cylindrical shape however in further embodiments the connector may be in a cone or other shape having sloped surfaces to remove flat, horizontal areas where debris may collect and to facilitate run off of material during spray cleaning.

In a further embodiment, the round style bracket (not shown) may be a single bracket extending around to form a circle with a single toroid shaped grommet having a channel being placed within the bracket. The bracket is secured within the channel with the rounded edges of the grommet extending up and around the edges of the bracket to a point level with the outer surface of the bracket as described above. The bracket having an opening and slit cut through one portion of the toroid grommet to provide for the bracket and grommet to be separated and installed around a pipe. During installation, the bracket may rest around the pipe so that it may be easily held and positioned. Suitable hardware may be installed to secure the bracket opening and adjust the tightness of the grommet around the tube, pipe or conduit.

The invention has been described in detail with particular reference to certain preferred embodiments thereof, but it will be understood that variations and modifications can be effected within the spirit and scope of the invention.

What is claimed is:

1. A pipe supporting apparatus comprising:
a hexagonally shaped grommet having an upper portion and a lower portion that define a pipe passage extending through the grommet;
an upper bracket and a lower bracket for supporting the grommet including a securing mechanism for securing the upper and lower brackets with the grommet, the upper bracket and the lower bracket substantially forming a hexagon shape; and
a channel having a surface for receiving a mating portion of at least one of the upper and lower brackets to maintain the relative alignment and securing of the grommet and at least one of the upper and lower brackets even where the pipe passage in the grommet is subjected to axial forces from a supported pipe, the channel extending to opposing outer lateral edges of the grommet whereby debris can be washed from the surface of the channel and flow out the side of the grommet;
wherein when the grommet is secured around a pipe no fastener threads are exposed that may collect debris.

2. The pipe supporting apparatus as set forth in claim 1 wherein the upper portion and lower portion of the grommet form a substantially contiguous contact area about a circumference of the supported pipe.

3. The pipe supporting apparatus as set forth in claim 1 wherein the channel in the outer surface of the grommet is defined along substantially the entire length of the outer surface between first and second bolt passages formed in the grommet.

4. The pipe supporting apparatus as set forth in claim 3 wherein the channel extends along the length of the outer surface beyond the first and second bolt passages formed in the grommet.

5. The pipe supporting apparatus as set forth in claim 1 wherein the channel is defined along its length by a side portion of the grommet having an outer surface which is sloped from an upper edge to a lower edge intersecting with one of front and back faces of the grommet.

6. The pipe supporting apparatus as set forth in claim 5 wherein the upper edge of the grommet is flush with an upper surface of one of the upper and lower brackets so that a substantially uninterrupted surface is exposed to minimize collection of debris and material.

7. A pipe supporting apparatus comprising:
a bracket having an upper surface, a lower surface and surrounding side edges, the upper surface and the lower surface substantially forming a hexagon shape;
a hexagonally shaped grommet having an upper surface and a lower surface and surrounding side edges, the grommet defining a channel in the upper surface for receiving the bracket, the channel extending to opposing outer lateral edges of the grommet whereby debris can be washed from the surface of the channel and flow out the side of the grommet;
wherein the channel is defined along a length of the grommet by the side edges of the grommet having an outer surface which is sloped from an upper edge to a lower edge intersecting with one of a front and back faces of the grommet; and
wherein when the grommet is secured around a pipe no fastener threads are exposed that may collect debris.

8. The pipe supporting apparatus of claim 7 wherein the upper surface of the bracket is substantially flush with the upper edge of the side edges of the grommet and the bracket extends along the length of the grommet.

9. The pipe supporting apparatus of claim 8 wherein the channel is provided with a reverse chamfer in a lower edge of the channel for cooperating with a bottom edge of the bracket.

10. The pipe supporting apparatus of claim 8 wherein the lower surface of the grommet block includes a contiguous pipe contacting area for contacting at least 180 degrees of a pipe.

11. The pipe supporting apparatus of claim 7 further wherein the channel forms a matingly engageable surface for the bracket.

12. The pipe supporting apparatus of claim 7 wherein the at least one matching opening of the bracket and the grommet are square.

13. A method of connecting a pipe supporting apparatus to a conduit comprising the steps of:
providing a bracket having an upper surface, a lower surface and surrounding side edges, the upper surface and the lower surface substantially forming a hexagon shape;
forming a hexagonally shaped grommet having an upper surface and a lower surface and surrounding side edges, the grommet defining a channel in the upper surface for receiving the bracket, the channel extending to opposing outer lateral edges of the grommet whereby debris can be washed from the surface of the channel and flow out the side of the grommet;
defining the channel along a length of the grommet by forming the side edges of the grommet having an outer surface which is sloped from an upper edge to a lower edge intersecting with one of a front and back faces of the grommet; and
wherein when the grommet is secured around a pipe no fastener threads are exposed that may collect debris.

* * * * *